United States Patent
Dewonck et al.

(10) Patent No.: US 8,149,741 B2
(45) Date of Patent: Apr. 3, 2012

(54) APPARATUS AND METHOD FOR ASYMMETRICAL CONFERENCING BETWEEN LOCAL AND EXTERNAL TRANSCEIVERS

(75) Inventors: Benoit Dewonck, Hannut (BE); Didier Mattivi, Clavier (BE); Vincent Zander, Malmedy (BE); Philippe Joliet, Chênée (BE)

(73) Assignee: IPTRADE, Angleur (BE)

( * ) Notice: Subject to any disclaimer, the term of this patent is extended or adjusted under 35 U.S.C. 154(b) by 173 days.

(21) Appl. No.: 12/517,001

(22) PCT Filed: Nov. 28, 2007

(86) PCT No.: PCT/EP2007/062965
§ 371 (c)(1),
(2), (4) Date: Oct. 7, 2009

(87) PCT Pub. No.: WO2008/065149
PCT Pub. Date: Jun. 5, 2008

(65) Prior Publication Data
US 2010/0097959 A1   Apr. 22, 2010

(30) Foreign Application Priority Data
Dec. 1, 2006   (EP) .................................. 06125257

(51) Int. Cl.
*H04L 12/16* (2006.01)

(52) U.S. Cl. ........................................ 370/260

(58) Field of Classification Search .......... 370/352–394, 370/260, 285, 401
See application file for complete search history.

(56) References Cited

U.S. PATENT DOCUMENTS

| | | | | |
|---|---|---|---|---|
| 5,555,017 A * | 9/1996 | Landante et al. | .......... | 348/14.09 |
| 5,625,407 A * | 4/1997 | Biggs et al. | ................ | 348/14.11 |
| 6,608,820 B1 * | 8/2003 | Bradshaw, Jr. | ................ | 370/260 |
| 6,633,550 B1 * | 10/2003 | Gardenfors et al. | .......... | 370/280 |
| 7,245,660 B2 * | 7/2007 | Yona et al. | ................ | 375/240.13 |
| 7,707,262 B1 * | 4/2010 | Bill | .............................. | 709/207 |
| 2010/0124322 A1 * | 5/2010 | Bill | .......................... | 379/203.01 |

* cited by examiner

*Primary Examiner* — Ayaz Sheikh
*Assistant Examiner* — Blanche Wong
(74) *Attorney, Agent, or Firm* — Barnes & Thornburg LLP

(57) ABSTRACT

These multimedia conferencing apparatus and method manage asymmetrical public and/or private conferences. A conference takes place between an external transceiver and at least a local transceiver; local transceivers may take part to a plurality of conferences simultaneously. The apparatus comprises a communication interface connected to a packet data communication network in order to send and receive multimedia signals to and from the transceivers. A conference managing means is operable to determine, for each transceiver, which of the incoming multimedia signals received from the other transceivers are accessible to said transceiver, based on a transceiver's state and on data characterising the existing conferences, said state indicating whether said transceiver is participating to a private conference or to a public conference. A signal generating means generates for each transceiver at least an outgoing multimedia signal by mixing the incoming multimedia signals of the transceivers accessible to said transceiver.

28 Claims, 9 Drawing Sheets

APPARATUS AND METHOD FOR ASYMMETRICAL CONFERENCING BETWEEN LOCAL AND EXTERNAL TRANSCEIVERS

CROSS-REFERENCE TO RELATED APPLICATION

This application is a National Stage filing of PCT International Application Serial No. PCT/EP2007/062965, filed Nov. 28, 2007, which claims the benefit of European Application Serial No. 06125257.3, filed Dec. 1, 2006, the disclosures each of which are expressly incorporated herein by reference.

FIELD OF THE INVENTION

The invention relates to a multimedia conferencing apparatus and method for managing simultaneous asymmetrical public and/or private conferences wherein a conference takes place between an external transceiver and at least a local transceiver, local transceivers being able to take part to a plurality of conferences simultaneously. The apparatus comprises at least a communication interface connected to at least a packet data communication network; the communication interface is operable to send and receive multimedia signals to and from the transceivers.

The invention also relates to a communication system in which such a method can be implemented.

DESCRIPTION OF PRIOR ART

An asymmetrical conference between local agents and external agents happens when the external agents do not have the same rights or facilities as the local agents to take part to the conference. Asymmetrical conferences are common practice in stock market trading, where traders representing clients communicate with agents in international stock market places.

As an example, FIG. 9 discloses typical asymmetrical conferences taking place between traders and agents in international stock market such as Tokyo or London. A first public conference involves London with Trader 1, Trader 2 and Trader 4, while a second public conference gathers Tokyo with Trader 2, Trader 3 and Trader 4. In the first public conference, London, Trader 1, Trader 2, Trader 4 can communicate together with each other; similarly, Tokyo, Trader 2, Trader 3 and Trader 4 can communicate with each other in the second private conference. Trader 2 (similarly Trader 4) takes part in two conferences simultaneously, which means that he can at the same time hear and talk to London, Tokyo, Trader 1, Trader 2. However, London and Tokyo can not hear nor talk to each other. At any time a trader (for instance Trader 1) can request a private conference with a financial place (for instance London) by activating a specific button on his telephone. Trader 2 is able neither to take part to the conversation between Trader 1 and London, nor to hear this private conversation.

Asymmetrical multimedia conferencing systems to allow asymmetrical conferences between local agents and external agents are known from the prior art. For instance, dedicated automated telephone switchboards (also called exchanges) are used for providing such asymmetrical audio conferences through the public switch telephone network (PSTN).

With the development of the Internet, has been created the Voice-over Internet Protocol (also called VoIP, IP Telephony, Internet telephony, Broadband telephony, Broadband Phone and Voice over Broadband), which is the routing of voice conversations over the Internet or through any other IP-based network. VoIP is becoming more and more popular and attempts to slowly replace the PSTN line with the so called broadband phone are flourishing. Indeed, the broadband phone offers many advantages in comparison with the PSTN system:

VoIP may offer greater functionalities in the sense that it can facilitate tasks that may be more difficult to achieve using traditional phone networks.

Mobility is a key aspect of VoIP; incoming phone calls can be automatically routed to the VoIP phone, regardless of where it is connected to the network. VoIP allows users to travel anywhere in the world and still make and receive phone calls.

VoIP is cheaper to use since free phone numbers for use with VoIP are available in some major countries.

VoIP phones can integrate with other services available over the Internet, including video conversation, message or data file exchange in parallel with the conversation.

Etc.

Audio conferencing are already available on broadband phones and asymmetrical conferencing using VoIP have been developed. These VoIP asymmetrical conferencing basically consists in establishing as many conferences as external agents, the local agents being free to join a conference at anytime. However a major problem arises when several local agents take part at several conferences simultaneously: referring to FIG. 9 again, Trader 3 is likely to hear twice Trader 4 creating an unbearable echo. Indeed, the voice of Trader 4 is transported twice in the framework of the first conference and of the second conference. Because no synchronisation between the different conferences is possible, Trader 4 voice transported twice digitally via different routes over the Internet reaches Trader 3 at different time creating echos. Should such system be used to establish video conferences as well, it will be impossible for agents taking part simultaneously to multiple conferences to receive a proper video signals.

Furthermore, VoIP conferencing does not provide the option of a private conference between a local and an external agent participating to a public conference. A new VoIP conference between these two agents only must be established, while the previous public conference with the external agent is closed, at least temporarily. Because re-establishing a new conference requires time, a local agent will have to wait before he can participate to the private conference he has requested. Such time delay may be unacceptable in situations where quick decisions are required.

In asymmetrical conferencing system, the conversation between a trader and an external agent, which may be confidential, often constitute the only proof of an approved deal between the trader and the external agent. VoIP conferencing does not provide a secure environment for the conversation between the local and the external agents, nor allow an easy the recording and retrieval of specific conversations.

It is an object of the invention to provide an asymmetrical conferencing server and system that allow asymmetrical conference between local agents and external agents using the Voice-over Internet Protocol and that solves the problems of the existing systems.

SUMMARY OF THE INVENTION

It is an object of the invention to provide a multimedia conferencing apparatus for managing asymmetrical public and/or private conferences between local and external transceivers in a packet data communication network. More specifically, it is an object of the invention to provide a fast, efficient, reliable apparatus to manage a plurality of multiple private and/or public conferences simultaneously while providing good quality multimedia signals for the transceivers and which is able to manage user requests without any delay.

To this end, the apparatus according to the invention is characterised in that it comprises:

a conference managing means:
- for managing data indicating the existing public and/or private conferences and the transceivers participating to said conferences; and
- for managing, for each transceiver, a state, in the sense of a state of a finite state machine, indicating whether a transceiver is participating to a private conference or to a public conference, wherein the conference managing unit is operable to determine, for each transceiver, which of the incoming multimedia signals received from the other transceivers are accessible to said transceiver, based on the transceivers state and on the data characterising the existing conferences; and a signal generating means for generating, for each transceiver, at least an outgoing multimedia signal by mixing the incoming multimedia signals accessible to said transceiver.

In the invention, a public conference is hold between only one external transceiver and at least a local transceiver, while a private conference is hold between only one external transceiver and only one local transceiver.

The apparatus defines an asymmetrical conference environment comprising all transceivers and manages the plurality of private and/or public conferences as a single global conference between all external and local transceivers. Each transceiver, whether it takes part to one or a plurality of public or private conferences, is considered as a participant to this single conference. The apparatus generates and sends at least an outgoing signal per transceiver, ensuring a good quality multimedia signal to the transceivers.

The apparatus defines the characteristics of the asymmetrical conference environment according to the existing conferences between the transceivers and according to the fact that the transceivers participating to this single global conference take part or not to private or public conferences.

The mixing of the incoming signals to generate an outgoing signal for a transceiver is advantageously based on these key characteristics: the apparatus takes into consideration the fact that the transceivers are taking part or not in private or public conferences to allow or not the mixing of their incoming signals. The generation of an outgoing signal for a transceiver depends on existing conferences between other transceivers, making it possible to manage efficiently a plurality of multiple private and/or public conferences simultaneously. The apparatus decides how a conference shall be handled depending on the existing conferences between the transceivers. In that way, the conferencing apparatus efficiently handles the request for conferences while preserving existing conferences.

Determining transceivers characteristic in the asymmetrical conference environment is further particularly fast and efficient since it consists in simply determining a state, in the sense state of a finite state machine, among a limited list of possible states, regardless of the number of conferences a transceiver is taking part to.

It is yet another object of the invention to provide a conferencing apparatus that provides a secured and protected environment for the exchange of communication between the transceivers.

In an asymmetrical conferencing system, the conversations between a trader and an external agent, which may be confidential, often constitute the only proof of an approved deal between the trader and the external agent. VoIP conferencing does not provide a secure environment for the conversation between the local and the external agents, nor allow an easy the recording and retrieval of specific conversations.

To this end, the conference managing means is operable to determine, for each local transceiver, and for each of the conferences said local transceiver is taking part to, accessible incoming multimedia signals, based on the transceivers state and on the data characterising the existing conferences.

The conferencing managing means determines in the framework of a private/public conversation with an external transceiver, the incoming signals that a local transceiver can receive. The multiple conversations and exchanges of data between a local transceiver and an external transceiver are dealt with separately, making it possible to record them and track them easily if necessary.

According to an embodiment of the invention, the signal generating means is operable to generate, for each local transceiver, a plurality of separate outgoing multimedia signals, each dedicated to one of the conference the local transceiver is taking part, by mixing the accessible incoming multimedia signals associated to said conference and said local transceiver. To increase security, the outgoing signals may be encrypted.

It is yet another object of the invention to provide a conferencing apparatus avoiding echoes. To this end, when two local transceivers are both simultaneously taking part to two or more public conferences with a same external transceiver, the incoming signal of the first local transceiver is mixed in only one of the outgoing signals of the second transceiver and vice-versa. In this way, a local transceiver receives the incoming signal of another local transceiver only once, through one outgoing signal only, avoiding echoes.

According to one embodiment of the invention, the communication interface is operable to receive at least a request from at least a local transceiver to take part to a private or public conference with an external transceiver and wherein the conference managing means is operable to accept or refuse said request based upon the state of the external transceiver. Such a request is refused, if the external transceiver participates to a private conference according to its corresponding state.

When such a request is accepted, the conference managing means is operable to update the data representing the existing conferences to add said requested conference or to add said local transceiver as a participant, if the conference with said external transceiver exists already. The conference managing means is further operable to give access to the local transceiver's incoming multimedia signal to the external transceiver and vice-versa.

According to an embodiment of the invention, when the request is a request for a public conference, the conference managing means is operable to give access to the incoming multimedia signal of said local transceiver to at least some of the local transceivers already participating to a public conference with said external transceiver and vice and versa.

The communication interface is further operable to receive at least a request from at least a local transceiver to terminate a conference with an external transceiver. The conference managing means is operable, upon receipt of said termination request, to update, if required, the state of said external and local transceivers to indicate the end of the conference. Similarly, the conference managing means is operable, upon receipt of said termination request, to update data indicating existing conferences to either remove said conference or to remove said local transceiver as a participant to said conference.

The conference managing means is operable, upon receipt of said termination request, to update the access of incoming multimedia signals based on the other existing conferences stored in the general table and the state of the transceivers. The local transceiver may quit a conference at any time without disturbing other existing conferences.

Advantageously, when a conference terminates, the apparatus immediately reconsider the incoming signals that should be mixed for generating outgoing signals. By updating the access of incoming multimedia signals, it allows to reconsider the existing conferences and the exchange of multimedia signals between the various transceivers as if the conference that ends had never taken place.

In accordance with one illustrative embodiment of the invention, the apparatus may further comprise an access means for accessing a memory means, said memory means being operable to store data representing the state of the transceivers and/or the at least one mixing matrix and/or the data indicating the existing conferences and their participants.

According to one embodiment of the invention, the multimedia signals comprise voice-over-IP packet-based signals.

According to one embodiment of the invention, the multimedia conferencing apparatus comprises a signalisation control unit operable to establish for each transceiver at least a direct bi-directional communication channel to exchange the multimedia signals associated to said transceiver.

According to one embodiment of the invention, the signalisation control unit is operable to establish for each local transceiver, a plurality of separate direct bi-directional communication channels between the communication interface and the local transceiver, each dedicated to the communication with one external transceiver only. The outgoing signals associated to the local transceiver and to the conference between this local transceiver and an external transceiver are sent through the direct communication channel dedicated to the communication with this external transceiver, providing in this way a highly secure environment.

The signalisation control unit may also be operable to establish for each external digital transceiver a direct bi-directional communication channel to exchange the multimedia signals with said external transceiver. Alternatively, a direct bi-directional communication channel may be established with at least a gateway operable to exchange the multimedia signals with at least one of the external transceiver.

In accordance with one illustrative embodiment of the invention, the signalisation control unit establishes bi-directional communication channels according to the Session Initialisation Protocol, while the multimedia signals are exchanged according to the Real-time transport protocol or to the Secured Real-time transport protocol.

The invention also relates to a method for managing simultaneous asymmetrical public and/or private conferences, wherein a conference takes place between at least a local transceiver and only one external transceiver, only local transceiver being able to take part to a plurality of conferences simultaneously, the method being performed in a data processing apparatus connected to a data packet-switched network. The method comprising the steps of:
receiving, through at least a communication interface connected to the network, incoming multimedia signals from transceivers;
managing, by a conference managing means:
data indicating the existing public and/or private conferences and the transceivers participating to said conferences; and
for each transceiver, a state, in the sense of a state of a finite state machine, indicating whether a transceiver is participating to a private conference or to a public conference;
determining by said conference managing means, for each transceiver, which incoming multimedia signals received from the other transceivers are accessible to said transceiver, based on the state of said corresponding other transceivers and on the data characterising the existing conferences;
generating, for each transceiver, by a signal generating means, at least an outgoing multimedia signal by mixing the incoming multimedia signals of the transceivers accessible to said transceiver.

The invention also relates to a communication system for managing simultaneous asymmetrical public and/or private conferences, wherein a conference takes place between at least a local transceiver and only one external transceiver, only local transceivers being able to take part to a plurality of conferences simultaneously, said system comprising:
a local packet data communication network operable to transmit multimedia signals;
at least one local transceiver connected to said local network and operable to send and receive multimedia signals;
a gateway connected to the local network and to an external network, at least one external transceiver being connected to the external network; said gateway being operable to transmit multimedia signals between the external and the local network.

The apparatus comprises at least a multimedia conferencing apparatus according to the invention connected to the local network operable to send and receive multimedia signals to and from the transceivers in order to manage conferences between local and external transceivers.

The invention relates to computer programmes and storage medium storing such computer programmes comprising instructions in order to execute the invention.

SHORT DESCRIPTION OF THE DRAWINGS

These and further aspects of the invention will be explained in greater detail by way of example and with reference to the accompanying drawings in which:

FIG. 1 shows an asymmetrical conferencing system according to one embodiment of the invention;

FIG. 2 schematically shows the components of an embodiment of a Conferencing server, together with the notional functional processing units into which the Conferencing server components my be thought of as being configured when programmed by computer programme instructions according to one embodiment of the invention;

The figures are not drawn to scale. Generally, identical components are denoted by the same reference numerals in the figures.

DETAILED DESCRIPTION OF PREFERRED EMBODIMENTS

Figure 1:
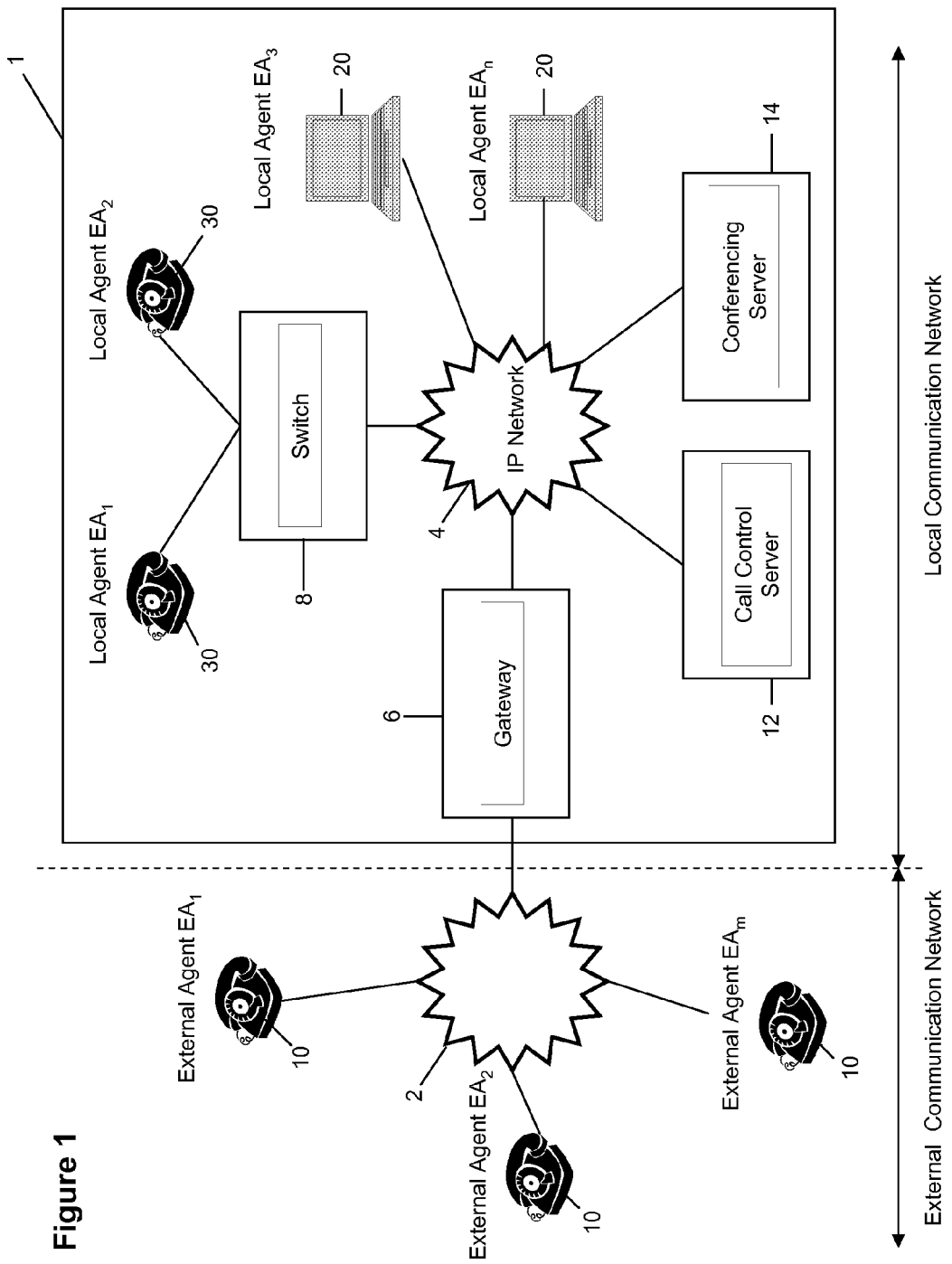

It will be appreciated by persons skilled in the art that the present invention is not limited by what has been particularly shown and described hereinabove. The invention resides in each and every novel characteristic feature and each and every combination of characteristic features. Reference numerals in the claims do not limit their protective scope. Use of the verb "to comprise" and its conjugations does not exclude the presence of elements other than those stated. Use of the article "a" or "an" preceding an element does not exclude the presence of a plurality of such elements.

The present invention has been described in terms of specific embodiments, which are illustrative of the invention and not to be construed as limiting.

FIG. 1 shows asymmetrical conferencing system 1 according to one embodiment of the invention connected to an external communication network 2 to which several external transceivers 10 are connected to. The conferencing system 1 is operable to provide an asymmetrical conferencing service between external and local transceivers.

The asymmetrical conferencing service between the external and local transceivers follow the following rules:

A public conference is held between one external transceiver only and at least one local transceiver.

All transceivers of a public conference can listen and talk to each other.

A local transceiver can take part simultaneously to two or more public conference. Participants to both conferences can hear and talk to said local transceiver. Other transceivers participating to only one of these conferences can only listen and talk to participants of said conference.

External transceivers are unaware of each other at any time and cannot listen or talk to each other.

At any time, a local transceiver can request to establish, join or leave a public conference with an external transceiver. External transceivers cannot request anything.

A private conference is held between one external transceiver and one local transceiver only. Both transceiver can listen and talk to each other. The local transceiver may authorize other local transceiver to listen to its private conversation with the external transceiver; they cannot take part to the conversation.

Private and public conferences can take place simultaneously. An external transceiver cannot participate to a private conference and another conference simultaneously, while a local transceiver can take part to a private conference and a plurality of public conferences simultaneously. When a local transceiver participates to a public conference with a first external transceiver and requests a private conference with a second external transceiver, the local transceiver can still take part to the public conference with the first external transceiver.

At any time, a local transceiver can request to establish or leave a private conference with an external transceiver. External transceivers cannot request to establish or join a private conference.

The conferencing system 1 comprises a local communication network 4 connected to the external communication network 2 via a gateway 6. The gateway 6 is seen by the external communication network 2 as a set of external transceivers 10.

The external communication network 2 is preferably a public communication network although a private communication network is also possible. The external communication network is able to transmit, between the different transceivers connected to the network 2, voices and video calls. The external communication network 2 may consist of a traditional Public Switch Telephone Network (PSTN or leased lines) or of a packet-switched network (such as an IP-based network with the Voice-over-IP protocol (VoIP) or a GPRS or ATM based network), or of a combination of both.

The local communication network 4 is a packet-switched network, preferably an IP-based packet-switched network. The internal communication network 4 is able to transmit voice and video calls using for instance the Voice-over-IP protocol (VoIP). The signalling protocol used by the various components of the VoIP local network 4 can be the Session Initiation Protocol (SIP) or the H.323 protocol or proprietary protocol such as SCCP from Cisco, while the Real-time transport protocol (RTP) or Secure Real-Time Transport Protocol (SRTP) or any other proprietary protocol such as Skype® may be used for the transmission of multimedia data streams. The local network 4 may consist of a private network or of a public network or of a combination of both.

According to another embodiment of the invention not represented, both the local and external networks are IP network and the connection between both networks does not require any gateway.

Local digital transceivers 20 are connected to the local communication network 4 directly, while local analog transceivers 30 are connected to the local network 4 through a local telephone switch 8. The analog transceivers 30 are connected to the telephone switch 8. The switch 8 comprises and analog-to-digital converter (A/D) and a digital-to-analog converter (D/C) (not represented) to convert digital signals received from the local network 4 into analog signals and the analog signals received from the analog transceivers 30 into digital signals. The telephone switch 8 transmits signals between the local network 4 and the analog transceivers 30 and between the analog transceivers 30.

The external and local transceivers 10, 20, 30 are for instance telephones, mobile phones, Personal Digital Assistants (PDA), computers, etc. As a matter of example, the external transceivers 10 are used by external agents $EA_1$, $EA_2$, $EA_m$ located in international stock markets such as London, Tokyo, New York, while the local transceivers are used by local traders or agents $LA_1$, $LA_2$, $LA_n$ of a trading company, which may have different offices in different locations. The local traders $LA_1$, $LA_2$, $LA_n$ of a same office are usually located in a same room.

A call control server 12, such as the CallManager® from Cisco® or the Communication Manager from Avaya® or any other VoIP Private Branch eXchange (VoIP-BPX or IP-BPX) vendor product, is also connected to the local network 4 as well as a Conferencing server 14.

The various components of the local network 4 (telephone switch 8, gateway 6, call control server 12, Conferencing server 14, Local Transceivers 20, 30) can be located in one building or in different locations.

A global unique identifier IDG is associated to each of the external transceivers 10. The gateway 6 is seen by the external network 2 as a series of external transceivers and several unique global identifiers IDG are associated to the gateway 6.

A unique local identifier IDL is allocated to each of the local transceivers 20, 30. Typically, the unique global identifiers IDG are phone numbers or extension numbers. Unique local identifiers IDL of local transceivers 30 consists of phone numbers or extensions. The extension of a digital local transceiver can be associated to its internal IP address; the call control server 12 stores a map linking the extension number, i.e. the unique local identifier IDL, of a local transceiver to its IP address, allowing the IP address to be modified if necessary.

Each of the local unique identifier IDL is associated to one of the unique global identifiers IDG allocated to the gateway 6; different unique local identifiers IDL can be associated to a same unique global identifiers IDG of the gateway.

The call control server 12 tracks all active local network components; it evaluates called numbers and activates gateway events to receive or send calls to the external network 2 and within the local network 4. It manages the mapping between the unique local identifiers of the local transceivers 20, 30 and the unique global identifiers of the gateway 6. It manages requests from the local transceivers 20, 30 to enter into a communication with other local transceivers 20, 30 or with external transceivers 10.

The asymmetrical conferencing system according to the invention allows the local and external agents $EA_1$, $EA_2$, $EA_m$, $LA_1$, $LA_2$, $LA_n$ to communicate together either in public or private conferences.

To request or cancel a public or private conference, a local agent can press, as a matter of example, a specific button on his telephone or clicks on a specific button in a programme running on his computer before entering the number of the external transceiver.

In a public conference between an external agent EAj and several local agents LAi, each of these local agents $LA_i$ can speak to the external agent $EA_j$. All the local agents can hear what the external agent EAj says. The local agents participating to a same public conference can either hear each other or not depending on the configuration of the conferencing system. For instance, it is important, in order to avoid any echo, that they cannot hear each other when they sit in the same room next to each other.

Several public conferences with different external agents EAj can be established at the same time. A local agent LAi can be participating to several different public conferences. External agents $EA_1$, $EA_2$, $EA_m$ remain unaware of each other, especially when several public conferences are established; they can never hear each other.

According to the invention, a private conference between a local and an external agent $LA_1$, $EA_j$ can be established at the request of a local agent LAi. In a private conference, only the local and external agents LAi and EAj can hear and talk to each other. None of the other agents $EA_{q\neq j}$, $LA_{p\neq i}$ can hear or take part to the conversation of the local $LA_n$ participating to the private conference with the external agent $EA_m$. In one embodiment of the invention not further disclosed, a local agent LAi participating to a private communication with an external agent EAj may have authorised some of the other agents $LA_{p\neq i}$ participating to a public conference with the same external agent EAj, at the time of the establishment of the private conference, to hear the private conversation between the local agent LAi and the external agent EAj.

A local agent LAi can be involved in one private conference with a first external agent and several public conferences with other external agents. As soon as a private conference ends up, the exchange of communication is re-established as if the private conference did not take place.

The Conferencing server 14 consists of a data processing apparatus that establishes and controls public and private conferences between the external and local transceivers $LA_i$, $EA_j$. More specifically, the Conferencing server 14 manages the incoming video/voice signals from the various transceivers 10, 20, 30 and generates video/voice outgoing signals for these transceivers 10, 20, 30. The conferencing server 14 is also operable to initiate and process the initialisation and registration process of the Conferencing server 14 with the Call control server 14. The Conferencing server 14 stores and manages configuration data necessary for the conference service. The conferencing server 14 is operable to receive, control and process the request from local transceivers 20, 30 to access the conference service.

Figure 2:
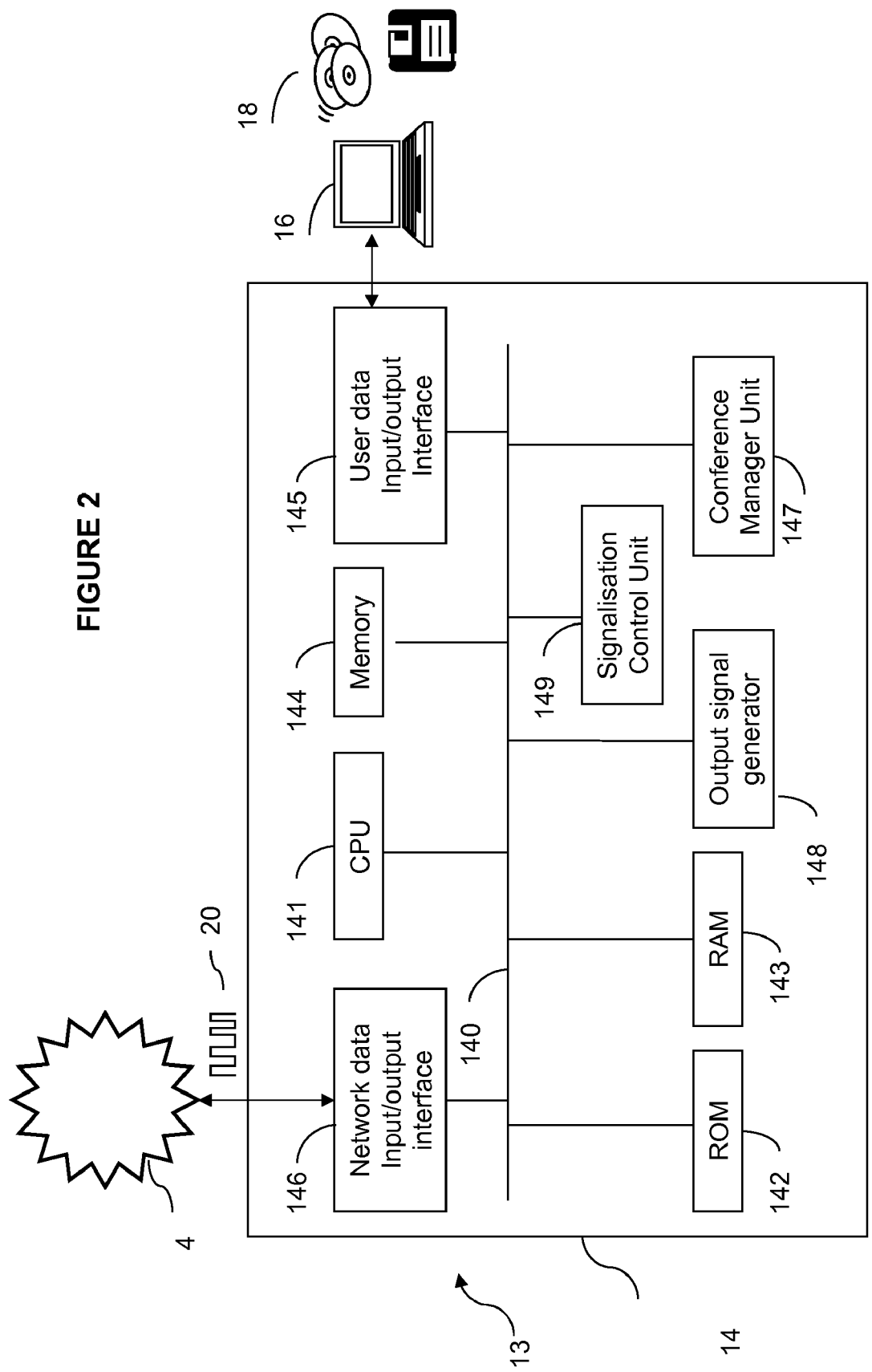

FIG. 2 schematically shows the components of an embodiment of a Conferencing server 14.

The Conferencing server 14 comprises a programmable processing apparatus 13, such as a personal computer (PC), containing, in a conventional manner, one or more processors, memories, user input and output devices 16 comprising a display device such as a conventional personal computer monitor, keyboard, mouse etc.

The processing apparatus 13 is programmed to operate in accordance with programming instructions input, for example, as non-transitory data stored on a non-transitory data storage medium 18 (such as an optical CD ROM, semiconductor ROM, magnetic recording medium, etc), and/or as a signal 20 (for example an electrical or optical signal input to the processing apparatus 1, for example from a remote database, by transmission over a communication network 4 such as the Internet or by transmission through the atmosphere, and stored in non-transitory memory), and/or entered by a user via the user input device 16 such as a keyboard.

As will be described in more detail below, the programming instructions comprise instructions to program the processing apparatus 13 to become configured to send and receive multimedia signals to and from local and external transceivers, to manage a subset of local and external transceivers for each registered transceiver and to generate an outgoing multimedia signal for each transceiver, by mixing the incoming multimedia signals of the transceivers belonging to the subset corresponding to said transceiver.

When programmed by the programming instructions, processing apparatus 1 can be thought of as being configured as a number of functional units for performing processing operations. Examples of such functional units and their interconnections are shown in FIG. 2. The units and interconnections illustrated in FIG. 2 are, however, notional, and are shown for illustration purposes only to assist understanding; they do not necessarily represent units and connections into which the processor, memory etc of the processing apparatus 1 actually become configured.

Referring to the functional units shown in FIG. 2, the processing apparatus comprises an internal communication bus 140 to which are connected:

a central processing unit 141 (CPU) operable to provide controlling and processing for the various functional units of the processing apparatus, as well as their interoperability;

a Read Only Memory (ROM) 142 storing programming instructions;

a Read Access Memory (RAM) 143 where are stored registers operable to store variables and parameters created and updated during the execution of programmes;

memory 144, such as a hard disk, storing programming instructions, configuration data, etc. Memory 144 is provided for use by the central processing 141 and the other functional units. Memory 144 may comprises memory means directly connected to the bus 140 as well as remotely located memory means connected to the processing apparatus via a communication interface connected to a communication network.

a user input/output data interface 145 operable to control the transfer of input and output data between the processing apparatus 13 and the user interface 16.

a network input/output data interface 146 connected to the local network 4;

a conference manager unit 147;

an output signal generator 148;

a control signalisation unit 149.

The communication bus 140 allows communication and interoperability between the various units of the processing apparatus 1 or connected to it. The interconnections of the bus 140 with the various units are shown for illustration purposes only. As a matter of example, the Central processing unit 141 may transmit data to any unit of the processing apparatus 13 directly or via any other unit of the processing apparatus.

The network input/output data interface 146 is operable to control the input and output of data from and to the different equipments of the local network 4. In this embodiment, the input and output data comprises communication requests and confirmation messages to and from the call control server 12, requests and confirmation messages as well as voice and video signals to and from the local transceivers 20, 30 (directly or to the telephone switch 8). The voice and video signals are transferred using a protocol such as RTP or SRTP, while the signalisation data are sent according to a protocol such as SIP or H. 323.

The control signalisation unit 149 is operable to analyse and generate control and command signals received by and sent to the Network data input/output interface 146 in order to manage sessions (such as creating, modifying, and terminating sessions) with one or more equipments (local agents LAi 20, Switch 8, Conferencing server 14, Gateway 6) of the local network 4 according to a signalisation protocol such as SIP or H. 323. The control and command signals may be encrypted or not. More specifically, the control signalisation unit 149 is operable to initiate, to process and control the initialisation and registration processes (as described below) of the conferencing server 14 with the call control server 12 in order to establish calls with the external transceivers EAj.

The Conference Manager Unit 147 is operable to establish and to control public and private conferences between the external and local transceivers $LA_i$, $EA_j$, as it will be explained in more details below.

More specifically, the conference Manager Unit 147 is operable to manage a map of the different conferences between the various local and external transceivers $LA_i$, $EA_j$. According to one embodiment of the invention, the conference map is represented by a table T1 stored in memory 144. The following table T1 indicates the public or private on-going conferences between the local and external transceivers EAj, LAi.

TABLE T1

| | LOCAL EXTENSION NUMBER IDL OF EXTERNAL TRANSCEIVER EAJ | | | |
|---|---|---|---|---|
| | 100 (EA1) | 101 (EA1) | 200 (EA2) | 300 (EA3) |
| Public conference with local transceiver LAi | No | 810 (LA1) | 830 (LA3) | No |
| Private conference with local transceiver LAi | No | No | 820 (LA2) | NO |

The conference Manager Unit 147 is further operable to manage the state (in the sense of a stats of a finite state machine) of the various local and external transceivers $LA_i$, $EA_j$. A local transceiver is in a "private" state (resp. "public" state), when participating to a private conference (resp. public conference). A local transceiver is in a "idle" state when it has registered to the conferencing service and is not participating to any conference (public or private). An external transceiver is either in a "private" or "public" state, depending on whether it takes part to a private or public conference. The state "idle" is not available for external transceivers.

The state of a transceiver indicates the current situation of the transceiver in the conferencing service.

According to an embodiment of the invention, the transceivers states are gathered in a table T2 stored in memory 144. The following table T2 indicates whether the local or external transceiver LAi, EAj is in a "idle", "private" or "public" state.

TABLE T2

| | TRANSCEIVERS | | | | | | |
|---|---|---|---|---|---|---|---|
| | LA1 | LA3 | ... | LAL | EA1 | ... | EAP |
| State | Idle | Idle | | Private | Public | Public | Private | Public |

The conference Manager Unit 147 is also operable to initiate, process and control the direct bi-directional communications channels between the Conferencing server 14 and the gateway 6 or the local transceiver LAi (as it will be explained in greater details below).

The output signal generator 148 is operable to generate an outgoing video and/or voice signal for each transceiver $LA_i$, $EA_j$ participating to a public or private conference. The output signal generator 148 comprises a mixer for mixing incoming video/voice signals of local from local and/or external transceivers LAi, EAj and for generating outgoing video/voice signals. More specifically, when generating an outgoing video/voice signal for an external or local transceiver EAj, LAi, the mixers mixes the incoming signals of the transceivers EAl, LAk according to mixing matrices M(LAi, EAj), M(EAj) stored in memory 144 and associated to the external or local transceiver EAj, LAi. The mixer can be an independent piece of hardware integrated into the processing apparatus 1 or a logical software module or a combination of both. The video/voice signals may be encrypted or not.

The conference manager unit 147 manages a set of mixing matrixes M(EAj) associated to the external transceivers EAj and indicating which incoming signals are to be mixed to generate the outgoing signal for the registered external transceivers EA.

| Matrix M(EAj) | | | | |
|---|---|---|---|---|
| | INCOMING SIGNALS | | | |
| | LA1 | LA3 | ... | LAI |
| Outgoing signals for external transceiver EAj | 0 | 1 | ... | 0 |

The matrix M(EAj) comprises 1 lines and p columns, where p defines the number of local transceivers LAi that have registered to the conference service.

Because the Conferencing server 14 is not aware of all the local transceivers LAi that can join the conference service, the size of the matrix M(EAj) varies.

The matrix M(EAj) ($m_k$) is defined as follows:

$m_{Tk}=0$ by default;

$m_k=0$ when the incoming signal of the local transceiver Tk shall not be mixed to generate the outgoing of the external transceiver EAj.

$m_k=1$ when the incoming signal of the local transceiver Tk shall be mixed to generate the outgoing of the external transceiver EAj.

The conference manager unit 147 manages the matrix M(EAj) associated to the external transceiver EAj according to the following rules:

Rule R1:

$m_i=0$ when the local transceiver $T_i$ is in an idle state.

Rule R2:

$m_i=1$ when EAj is in public conference with the local transceiver $T_i$ and no other local transceiver $T_{k,\ k\neq i}$ is in private conference with the external transceiver EAj;

$m_i=0$ when EAj is in public conference with the local transceiver $T_i$ and another local transceiver $T_{k,\ k\neq i}$ is in private conference with the external transceiver EAj.

Rule R3:

$m_i=1$ when EAj is in private conference with the local transceiver $T_i$ and $m_{k,\ k\neq i}=0$ when EAj is in private conference with the local transceiver $T_{i,\ i\neq k}$.

The conference manager unit 147 manages a set of mixing matrixes M(LAi, EAj) associated to the local transceivers LAi. A matrix M(LAi, EAj) is associated to each of the public or private conferences the local transceiver LAi is take part to. More specifically, the mixing matrix M(Lai, EAj) is associated to the conference between the local and external agents LAi, EAj and indicates which incoming signals are to be mixed to generate the outgoing signal for the local transceiver $LA_i$. Such signal shall be transferred through a direct bi-directional communication channel established between the local transceiver LAi and the conferencing server 14 representing the external transceiver EAj as it will be described in more details in FIG. 4.

| Matrix M(LAi, EAj) | | | | | |
|---|---|---|---|---|---|
| INCOMING SIGNALS | LA1 | LA3 | ... | LAL | EAJ |
| Outgoing signal for LAi | 0 | 1 | 1 | 0 | 1 |

The matrix M(LAj, EAj) comprises 1 lines and l columns, where l defines the number of local transceivers LAi, that have registered to the conference service. The transceiver $T_{LAI}$ is not represented in its own mixing matrix, since its incoming signal shall not be mixed to generate its outgoing signals in order to avoid echoes.

Because the Conferencing server 14 is not aware of all the local transceivers LAi that can join the conference service, the size of the matrix M(LAi, EAj) varies.

The matrix M(LAi, EAj) ($m_{Tk}$) is defined as follows:

$m_{Tk}=0$ by default;

$m_{Tk}=0$ when the incoming signal of the transceiver Tk shall not be mixed to generate the outgoing of the local transceiver LAi in the conference with the external transceiver EAj;

$m_{Tk}=1$ when the incoming signal of the transceiver Tk shall be mixed to generate the outgoing of the local transceiver LAi in the conference with the external transceiver EAj;

The transceiver Tk can either be a local transceiver LAk, $k\neq i$ or the external transceiver EAj.

The conference manager unit 147 manages the matrix M(LAi, EAj) associated to the conference between the local transceiver LAi and the external transceiver EAj according to the following rules:

Rule R4:

$m_{Tk}=0$ when the local transceiver Ti is in an idle state;

Rule R5:

The local transceiver LAi is in public conference with the external transceiver EAj and no other local transceiver $LA_{k,\ k\neq i}$ participates to a private conference with the same external transceiver EAj.

$m_{EAj}=1$ $m_{LAk,k\neq i}=1$ when the other local transceiver $LA_{k,k\neq i}$ is in public conference with the same external transceiver EAj; and 0 otherwise.

The local transceiver LAi may indicate that, in case of a public conference with the external transceiver EAj, some of the other local transceivers $LA_{k,k\neq j}$ cannot receive its incoming signal (e.g. to avoid echo when both local agents sit next to each other) and vice-versa To each local transceiver LAi is associated a list L1(LAi) comprising the local unique identifier of these local transceiver $LA_{k,k\neq j}$ which are not allowed to hear the local transceiver LAi.

In that case, Rule R5 is modified as follows:

$M_{EAj}=1$ $m_{LAk,k\neq 1}=1$ when the other local transceiver $LA_{k,k\neq j}$ is in public conference with the same external transceiver EAj and when $LA_{k,k\neq j} \notin L2(LAi)$; 0 otherwise.

Rule R6:

The local transceiver LAi is in public conference with the external transceiver EAj and another other local transceiver $LA_{k,k\neq i}$ participates to a private conference with the same external transceiver EAj.

$m_{EAj}=0$ $m_{LAk,k\neq i}=0$ when the other local transceiver $LA_{k,k\neq j}$ is in private conference with the same external transceiver EAj; and $m_{LAl,l\neq k,l\neq i}=0$ for the other local transceivers $LA_{l,l\neq k,l\neq i}$ not in private but public with the external transceiver EAj.

Rule R7:

The local transceiver LAi is in private conference with the external transceiver EAj.

$m_{LAj}=1$

According to another embodiment, the conference manager unit 148 manages a set of mixing matrix M(LAi) associated to each local transceiver LAi indicating the incoming signals of all transceivers connected to the conferencing service that are to be mixed to generate the outgoing signal for the local transceiver LAi. In this embodiment, only one direct bi-directional communication channel is established between the gateway 6 and the local transceiver LAi regardless of the number of conference the local transceiver LAi is taking part to.

According to another embodiment, the conference manager unit 148 manages a single matrix M indicating which incoming signals are to be mixed to generate the outgoing signal for these transceivers LAi, EAk.

Memory 147 comprises configuration data to be used by the Conference Manager Unit 147 to create and manage the mixing matrices M(EAj), M(LAi, EAj) associated to the external and local transceivers EAj, LAi, as well as to store these matrices.

Memory 147 further comprises:
the unique global identifiers IDG of the external transceivers $EA_j$ available for the conference service and which can be called in public/private conference,
the table T1, T2, the lists L1(LAi), etc.

Figure 3:
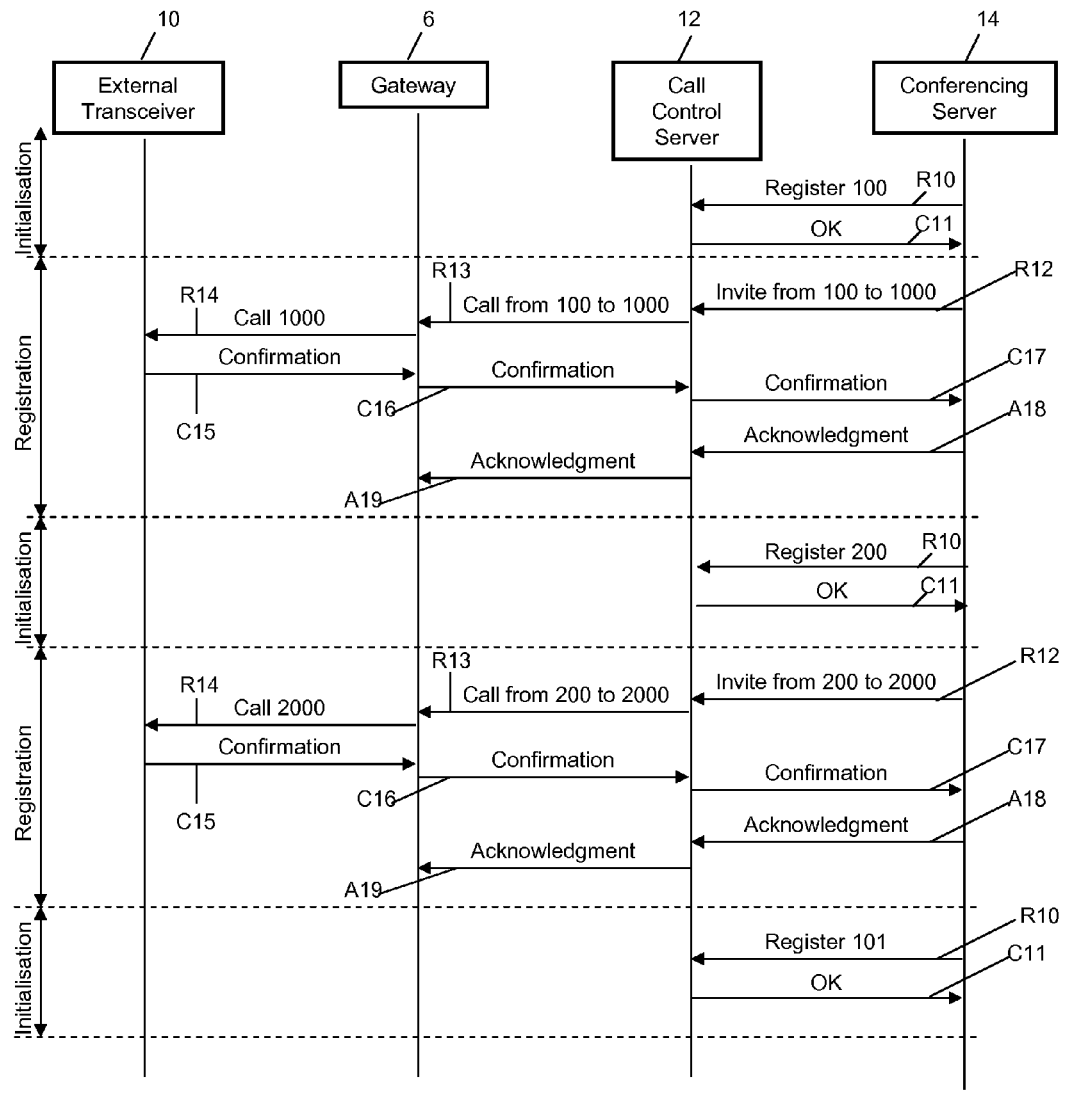
FIG. 3 shows the process of establishing calls between the conferencing server and external transceivers in order to set up a conference service between several local and external transceivers according to one embodiment of the invention.

FIG. 3 shows the process of establishing calls between the Conferencing server 14 and the external transceivers $EA_j$ in order to set up the conference service between several local and external transceivers $LA_i$, $EA_j$ according to one embodiment of the invention.

The Conferencing server 14 is seen by the Call control server 12 as a set of normal digital local transceivers 20 having each a unique local identifier IDL (typically represented by an extension number 100, 101, 200, 300); the Call control server 12 allocates these several unique local identifiers IDL to the Conferencing server 12, which are stored in memory 144.

The Conferencing server 12 is seen by the local transceivers LAi as proxy local transceivers that represent each of the external transceivers $EA_1$, $EA_2$, $EA_m$. A table or map T1, stored in memory 144, associates each of the unique local identifiers IDL allocated to the conferencing server 14 by the call control server 12 to a unique global identifier IDG associated to a single external transceiver 10.

Typically, the Conferencing server 14 associates each of its local unique identifiers IDL representing a local extension numbers to a single global unique identifier IDG representing the real phone number of an external transceiver.

Several local unique identifiers IDL of the Conferencing server 12 can be associated to a same unique global identifier IDG of an external transceiver, making it possible to join a same external transceiver through several local extension numbers. Indeed, most of the VoIP-PBX available on the market can manage a maximum of extension numbers; similarly they manage a limited number of parallel active calls by extension numbers, which limits the number of local transceivers LAi which can take part to the conferencing service. To associate several local unique identifiers IDL of the Conferencing server 12 to a same unique global identifier IDG of an external transceiver prevents such limitation.

As a matter of example, the following table (Table T3) represents a possible map associating local Identifiers IDL to global identifiers IDG. Such table is stored in memory 144.

TABLE T3

| | Local extension number IDL | | | |
|---|---|---|---|---|
| | 100 (EA1) | 101 (EA1) | 200 (EA2) | 300 (EA3) |
| Global extension number IDG | 012341000 | 012341000 | 012342000 | 012343000 |

Referring to FIG. 3 again, the Conferencing server 14 registered with the Call control server 12 as a set of normal digital local transceivers 20, during an initialisation process. The Conferencing server 14 sends for each of its local unique identifiers IDL an initialisation request R10 to the Call control server 12. Each registration request R10 comprises a local unique identifier IDL. The call control server 12 then sends back a confirmation message C11 to the Conferencing server 14 for each of the request R10.

After the initialisation process, the conferencing server 14 tries to establish communication with the external transceiver EAj. For that, bidirectional communication channels between the conferencing server 14 and the gateway need to be established for the exchange of voice and video data (i.e. for the establishment of calls). A separate communication channel between the gateway 6 and the conferencing server 14 needs to be established for the communication with each of the external transceivers EAj part of the conferencing service. When several local extension numbers of the conferencing server 14 are associated to the same unique global identifier IDG of an external transceiver EAj, only one communication channel between the gateway 6 and the conferencing server 14 is established.

The registration process for the establishment of calls consists in exchanging control and command signals between the gateway 6, the call control server 12 and the conferencing server 14, according to the signalisation protocol (for instance SIP protocol).

The conferencing server 14 starts the registration process by sending a registration request R12 to the Call control server 12. The registration request R12 comprises the global unique identifier IDL of the external transceiver EAj and one of the corresponding local unique identifier IDL (extension number) associated by the conferencing server 14 to the external transceiver EAj.

The request R12 comprises further information data necessary to the establishment of a direct communication channel for the exchange of voice and video data between the gateway 6 and the Conferencing server 14. As a matter of example, when SIP is used as the signalisation protocol and RTP as the protocol for exchange of voice/video data, the request 13 further comprises data indicating the IP address $IP_{EAj}$ of the conferencing server and a software port $P_{EAj}$ through which the conferencing server 14 will send voice and video data streams to the gateway 6 for the attention of the external transceiver EAj.

When the Call control server 12 receives the request R12, it associates the local unique identifier IDL associated to the conferencing server 14 to its IP address $IP_{EAj}$ and its port $P_{EAj}$ for sending voice/video data streams and stores the information in memory. The Call control server 12 then forwards the request R13 to the gateway 6 (request R14).

When the gateway 6 receives the request R14, it analyses the request R14 and establishes a communication between the gateway 6 and the external transceiver EAj if not already established. The call control server 12 pilots the gateway 6 to establish proper communication with the external transceivers EAj.

In any case, the gateway 6 sends a confirmation message C16 to the call control server 12 indicating a call with the external transceiver EAj is possible. The confirmation message C17 comprises further information data necessary to the establishment of a direct connection for the exchange of voice and video data between the gateway 6 and the Conferencing server 14. As a matter of example, the confirmation message C16 further comprises data indicating the IP address $IP_{gat}$ of the gateway 6 and a software port $P_{Gat(EAj)}$ thorough which the gateway 6 will send voice and video data stream to the conferencing server 14.

The Call control server 12 then forwards the confirmation message C16 to the Conferencing server 14 (confirmation message C17).

When it receives the confirmation message C17, the conferencing server 14 completes the Table T3 linking these data:

TABLE 3

| | LOCAL EXTENSION NUMBER IDL | | | |
|---|---|---|---|---|
| | 100 (EA1) | 101 (EA1) | 200 (EA2) | 300 (EA3) |
| Global extension number IDG | 012341000 | 012341000 | 012342000 | 012343000 |
| Gateway's IP address $IP_{Gat}$ | 123.456.17 | 123.456.17 | | x |
| Gateway's Port $P_{Gat}$ for receiving voice/video data stream | | | | x |
| Conferencing server's IP address $IP_{Gat}$ | | | | x |
| Conferencing server's Port $P_{EAj(EAj)}$ for sending voice/video data stream | | | | x |

Once the gateway 6, the call control server 14 and the conferencing server 14 have exchanged acknowledgment messages (A18, A19), the bi-directional communication channel between the conferencing server 14 and the gateway for the transmission of voice and video data streams between the conferencing server 16 and the external transceiver EAj is established according to the protocol for voice/video data transfer.

Alternatively, all the voice/video date streams are exchanged between the gateway 6 and the conferencing server 14 via a single bi-directional communication channel. In such case, each data stream or packet contains information identifying the external transceiver EAj from or to which the stream or packet is received or sent.

According to another embodiment, the conferencing server 14 starts the registration process "on demand" only when it receives a request from a local transceiver LAi to start a conference with an external transceiver EAj.

Several local identifiers IDL of the conferencing server 14 may be associated to the global identifier IDG of a same external transceiver EAj. In this case, a single direct bi-directional communication channel is established between the gateway 6 and the conferencing server 14 for the conference calls with the external transceiver EAj, whatever the number of local identifiers IDL associated to the external transceiver EAj is.

The initialisation and registration process is controlled on the conferencing server 14 level by its signalisation control unit 149. Once the bi-directional communication channel is established, the conference manager unit 147 of the conferencing server 14 controls the exchange of data stream.

Once the direct bi-directional communication channel is established between the gateway 6 and the conferencing server 14 for communication with the external transceiver EAj, the conference manager unit 147 updates the table T2 by adding a column for the external transceiver EAj indicating "public" as its associated state.

According to another embodiment the control and command signals (R10-A19) during the initialisation and registration processes consist of multicast messages through the local network 4.

Figure 4:
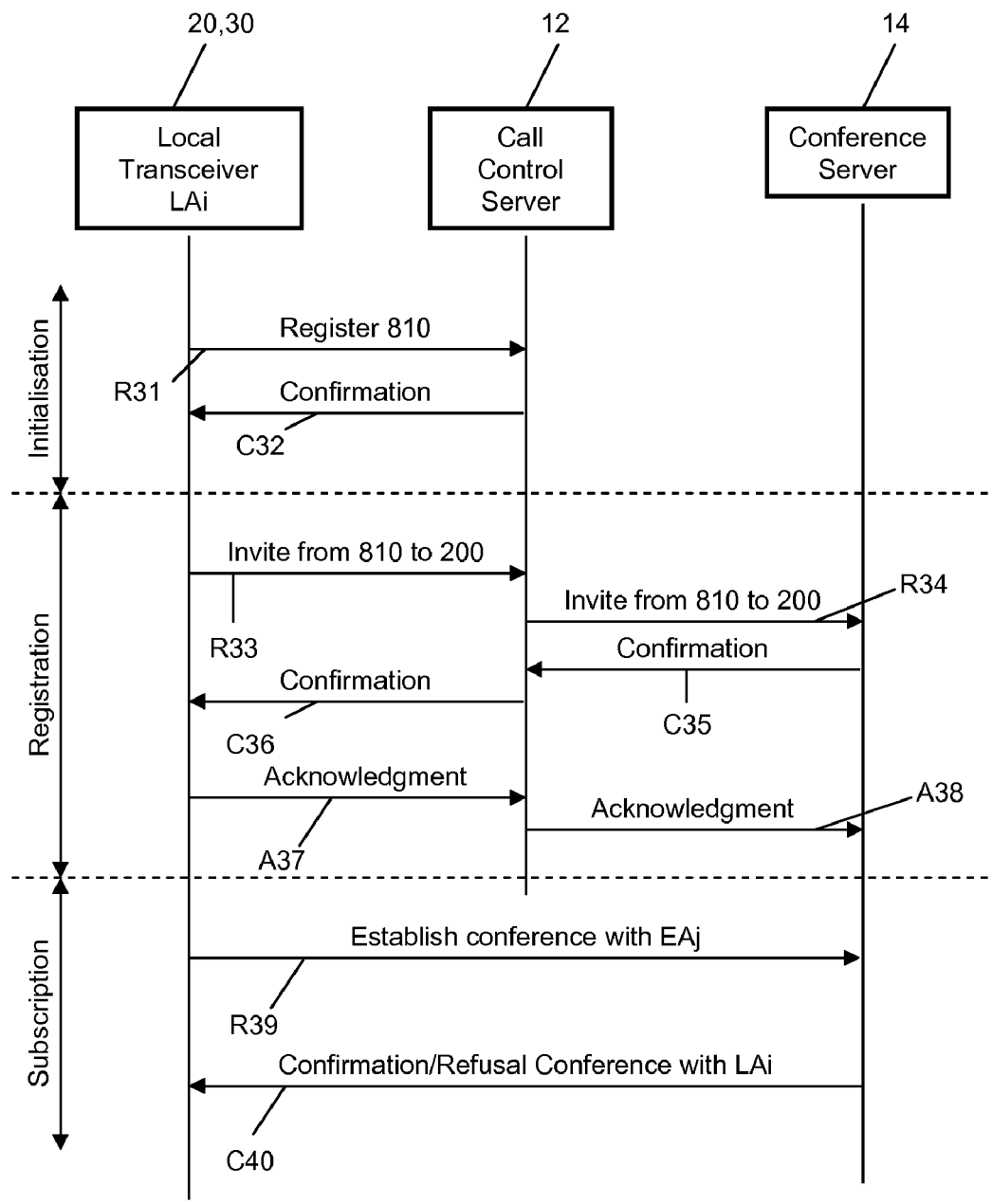
FIG. 4 shows the registration of a local transceiver to a public conference with an external transceiver according to one embodiment of the invention.

FIG. 4 shows the process of establishing calls between the Conferencing server 14 and a local transceiver $LA_i$ which wish to join the conferencing service in order to set up the conference service according to an embodiment of the invention.

A local transceiver $LA_i$ 20, 30 can request to join the conferencing service at any time. During an initialisation process, the local transceiver Lai sends an initialisation request R31 to the call control server 12 comprising its unique local identifier IDL. The initialisation process allows the local transceiver LAi to indicate its existence to the call control server 12 and to be identified.

When a local transceiver $LA_i$ wishes to join or establish a conference with an external transceiver EAj, a bidirectional communication channel between the conferencing server 14 and the local transceiver LAi is first established for the exchange of voice and video data (i.e. establishment of calls) to allow the exchange of voices/video data streams for the conference between the local transceiver LAi and the external transceiver EAj. The registration process for the establishment of calls consists in exchanging control and command signals between the local transceiver LAi, the call control server 12 and the conferencing server 14, according to the signalisation protocol (for instance SIP protocol).

The local transceiver $LA_i$ starts the registration process by sending a registration request R33 to the Call control server 12. The registration request R33 comprises the local unique identifier IDL of the local transceiver Lai and the local unique identifier IDL associated by the Conferencing server 14 to the external transceiver EAj.

The request R33 comprises further information data necessary to the establishment of a direct connection for the exchange of voice and video data between the Local transceiver LAi and the Conferencing server 14. As a matter of example, the request R33 comprises data indicating the IP address $IP_{LAi}$ of the local transceiver Lai and the software port $P_{LAi}$ thorough which the local transceiver will send voice and video stream. When the Call control server 12 receives the request R33, it associates the local unique identifier IDL associated to the local transceiver Lai to its IP address $IP_{LAi}$ and its port $P_{Lai}$ for sending voice/video data streams and stores the information in memory. The Call control server 12 then forwards the request R33 to the Conferencing server 14 (request R34).

When the conferencing server 12 receives the request R34, it stores the information contained in the request (local unique identifier IDL, local transceiver Lai IP address $IP_{LAi}$ and port $P_{Lai}$, unique identifier IDL of the external transceiver EAj) in memory 144. Then the conferencing server 14 sends a confirmation message C35 to the call control server 12 indicating communication with the external transceiver EAj is possible. The confirmation message C35 comprises further information data necessary to the establishment of a direct connection for the exchange of voice and video data between the Local transceiver LAi and the Conferencing server 14. As a matter of example, the confirmation message C35 comprises data indicating the IP address $IP_{LAi}$ of the conferencing server 14 and a software port $P_{conf(LAi)}$ through which the conferencing server 14 will send outgoing voice and video data stream to the local transceiver LAi. The conferencing server 14 stores in memory a table Table $T4_{conf(LAi,EAj)}$ associated to the conference between the local transceiver $LA_i$ and the external transceiver EAj and linking these different data:

TABLE T4 conf(LAi, EAj)

LOCAL TRANSCEIVER IDL 100
Local unique identifier IDL of external transceiver EAj
Local Transceiver $LA_i$ IP address $IP_{Lai}$
Local Transceiver $LA_i$ Port $P_{Lai}$ for receiving voice/video data stream
Conferencing server IP address $IP_{conf(LAi)}$
Port $P_{conf(LAi)}$ for sending voice/video data stream The Call control server 12 then forwards the confirmation message C35 to the local transceiver LAi (request C36).

Once the local transceiver LAi, the call control server 14 and the conferencing server 14 have exchanged acknowledgment messages (A37, A38), the bi-directional communication channel between the conferencing server 14 and the local internal transceiver $LA_i$ is established in order to allow the direct transmission of voice and video data streams according to the protocol for voice/video data transfer. The local transceiver LAi is now able to send a request message C39 to the conferencing server 14 (subscription process) through the established direct communication channel. The conferencing server 14 checks whether a conference between the local transceiver LAi and the external transceiver EAj is possible or not and sends a confirmation/refusal message A40 through the established direct communication channel accordingly. Both messages C39, C40 are sent according to the protocol for voice/video data transfer.

In this way, a separate direct communication channel is established between a local transceiver LAi and the conferencing server 14 for each external transceiver EAj local transceiver LAi wants to communicate with. The communication is established once; the local transceiver simply needs to indicate with a request sent to the conferencing server 14 through the direct communication channel whether it wants to communicate with the external transceiver EAj in a private or public manner. The mixing matrix M(LAi, EAj) associated to the conference between the local transceiver LAi and the external transceiver EAj is associated to the direct communication channel between the local transceiver LAi and the conferencing server 14 established for this conference.

Once the direct bi-directional communication channel is established between the local transceiver LAi and the conferencing server 14 for a conference with the external transceiver EAj, the conference manager unit 147 updates the table T2 by adding a column for the local transceiver LAi indicating "idle" as its associated state.

According to another embodiment, a single direct communication channel is established between the local transceiver LAi and the conferencing server 14 for all its communication with the external transceivers EAj available to the conferencing service. The voice and video data streams exchanged between the local transceivers and the conferencing server 14 indicates the unique local identification number of the external transceiver EAj for which the streams are intended to.

The registration process is controlled on the conferencing server 14 level by its signalisation control unit 149 according to a signalisation protocol. The communication through the bi-directional communication channel is controlled on the conferencing server 14 level by its conference manager unit 147 according to the protocol for voice/video data transfer.

According to another embodiment the control and command signals during the initialisation and registration process consist of multicast messages through the local network 4.

Figure 5:
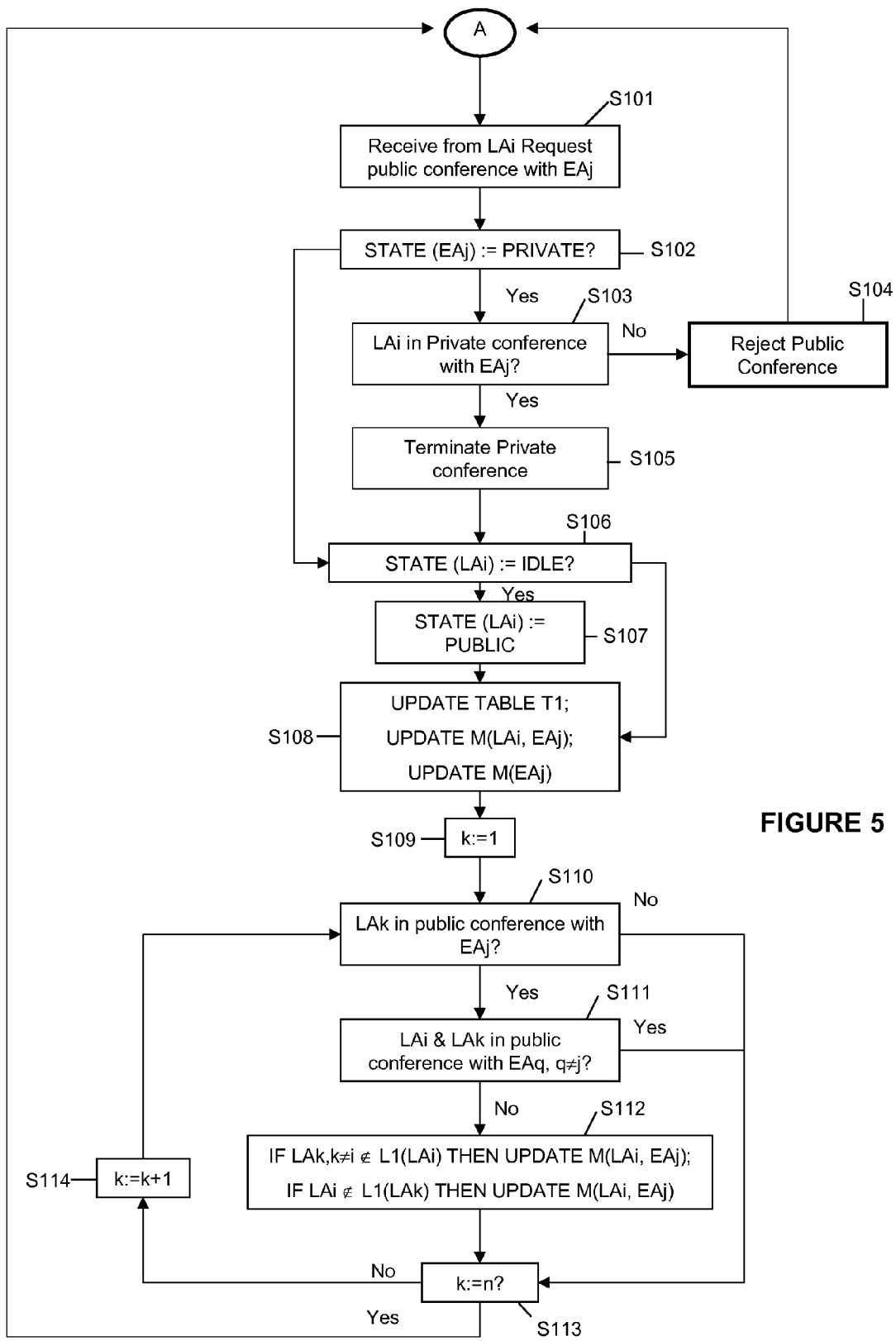
FIG. 5 shows the processing operation performed by the Conference manager unit to establish a public conference between a local transceiver and an external transceiver according to one embodiment of the invention.

FIG. 5 shows the processing operation performed by the Conference Manager Unit 147 to establish a public conference between a local transceiver $LA_i$ and an external transceiver $EA_j$.

Once the bi-directional communications channel between the conferencing server 14 and the local transceiver $LA_i$ has been established for a conference with an external transceiver EAj, the local transceiver LAi can request to talk to the external transceiver EAj either in private or public conference.

At step S101, the Conferencing server 14 receives a request R39 from the call control server 12 to establish a public conference between the local transceiver $LA_i$ and the external transceiver $EA_j$. The request message is sent through the direct communication channel between the conferencing server 14 and the local transceiver LAi dedicated to communication between the local transceiver LAi and the external transceiver EAj. The request may comprise the unique local identifier IDL of the local transceiver $LA_i$ and one of the unique local identifiers IDL associated to the external transceiver $EA_j$, although it is not necessary.

At Step S102, the conference manager unit 147 checks the state of the external transceiver $EA_j$ in the table T2. If the state is "PRIVATE", the conference manager unit 147 checks, at step S103, if the local transceiver LAi is in private conference with the external transceiver EAj by consulting the table T1.

If it is not the case, the external transceiver $EA_j$ participates to a private conference with another local transceiver LAk, k≠i and the local transceiver LAi cannot take part to a public conference with the external transceiver $EA_j$. Therefore, at step S104, the conference manager unit 147 requests the conferencing server 14 to send to the local transceiver LAi a message A40 refusing the request for public conference.

If the local transceiver LAi is in private conference with the external transceiver EAj, the conference manager unit 147 interprets the request for a public conference as a request to cancel the private conference in which the local transceiver LAi is involved; at step S104, it terminates the private conference (as it will be described in greater details in FIG. 8) before going to step S106.

If the state of the external transceiver EAj is not "PRIVATE", a conference between the local transceiver LAi can be established. The conference manager unit 147 checks at step S106 the state of the local transceiver $LA_i$ in the table T2.

If the state is "IDLE", the local transceiver LAi does not take part to any conference in the conferencing service. The conferencing server 147 changes the state of the local transceiver LAi into "PUBLIC" and updates the table T2 at step S107 before going to step S108.

If the state is not "IDLE", the local transceiver participates to a private or public conference with another local transceiver EAq,q≠k. As the state of the local transceiver must be maintained as such, the conference manager unit 147 goes directly at step S108.

At step S108, the conference unit manager 147 modifies the map of the conferences between the different transceivers: it updates table T1 to indicate that the local transceiver LAi is in public conference with the external transceiver EAj. It also updates the mixing matrix M(LAi,EAj) associated to the local transceiver LAi for the conference with the external transceiver EAj and the mixing matrix M(EAj) associated to the external transceiver EAj as follows:

For M(LAi, EAj), $m_{EAj}:=1$

For M(EAj), $m_{LAi}:=1$

Thus the outgoing signals generator 148, when generating the outgoing voice/video signals for the local transceiver LAi (resp. external transceiver EAj), will mix the incoming voice/video data streams sent by the external transceiver EAj (resp. local transceiver LAi).

In the asymmetrical conference system according to the invention, all local agents LAk participating to a public conference with a same external agent EAj can hear each others, unless they have specifically requested not to. Two local agents LAi, $LA_{k,k\neq i}$ may participate to a public conference with several external agents EAj EAq,q≠p. If it is the case, it is important that the first local agent $LA_{k,k\neq i}$ do not hear the voice of the second agent LAi twice (once through the first public conference and once through the second one).

Therefore, at the following steps S109-S114, the conference manager unit 147 determines how the different mixing matrixes should be updated.

At step S109, the conference manager unit 147 checks from Table T1 if the other local transceiver participates to a public conference with the external transceiver EAj.

If it is not the case, it is not necessary to amend any of the mixing matrices associated to both local transceiver LAi, $LA_{k,k\neq i}$ and the conference manager unit 147 goes directly to step S112.

Otherwise, the conference manager unit 147 determines from table T1, at step S110, whether the local transceiver LAi and the other local transceiver $LA_{k,k\neq i}$ are both already taking part to a public conference with any another external transceiver $EA_{q,q\neq p}$.

If both are taking part to at least a public conference with a same other external transceiver $EA_{q,q\neq p}$, the local transceiver LAi (resp. the other local transceiver $LA_{k,k\neq i}$) already receives the incoming voice/video data stream of the other local transceiver $LA_{k,k\neq i}$ (resp. the local transceiver LAi), as indicated by the mixing matrix $M(LAi, EA_{q,q\neq p})$ associated to the conference between the local transceiver LAi and the other external transceiver $EA_{q, q\neq p}$ (resp. by the mixing matrix $M(LA_{k,k\neq i}, EA_{q,q\neq p})$ associated to the conference between the other local transceiver $LA_{k,k\neq i}$ and the other external transceiver $EA_{q,q\neq p}$). Therefore, it is not necessary to update the mixing matrices $M(LAi, EA_j)$ or $M(LA_{k,k\neq i}, EAi)$ and the conference manager unit 147 goes directly to step S112.

If they are taking part to at least another public conference, the conference unit manager 147, at step S111, checks if the local transceiver LAi (resp. LAk) can receive the incoming voice of the other local transceiver LAk (resp. Lai) by consulting the list L1 (LAi) (resp. L1(LAk)). The conference manager unit 147 updates the mixing matrices $M(LA_{k,k\neq i}, EAj)$, associated to the conference between the other local transceiver $LA_{k,k\neq i}$ and the external transceiver EAj as well as the mixing matrix M(LAi,EAj) associated to the conference between the local transceiver LAi and the external transceiver EAj as follows:

for $M(LA_{k,k\neq i}, EAj)$, $m_{LAi}:=1$, if LAk,k≠i ∉ L1(LAi);
for $M(LA_i, EAj)$, $m_{LAk, k\neq i}:=1$ if LAi ∉ L1(LAk,k≠i).

The outgoing signal generator 148, when generating the outgoing voice/video signals for the other local transceiver $LA_{k,k\neq i}$ (resp. the local transceiver LAi) will mix the incoming voice/video data streams sent by the local transceiver LAi (resp. the other local transceiver $LA_{k,k\neq i}$).

Figure 6:
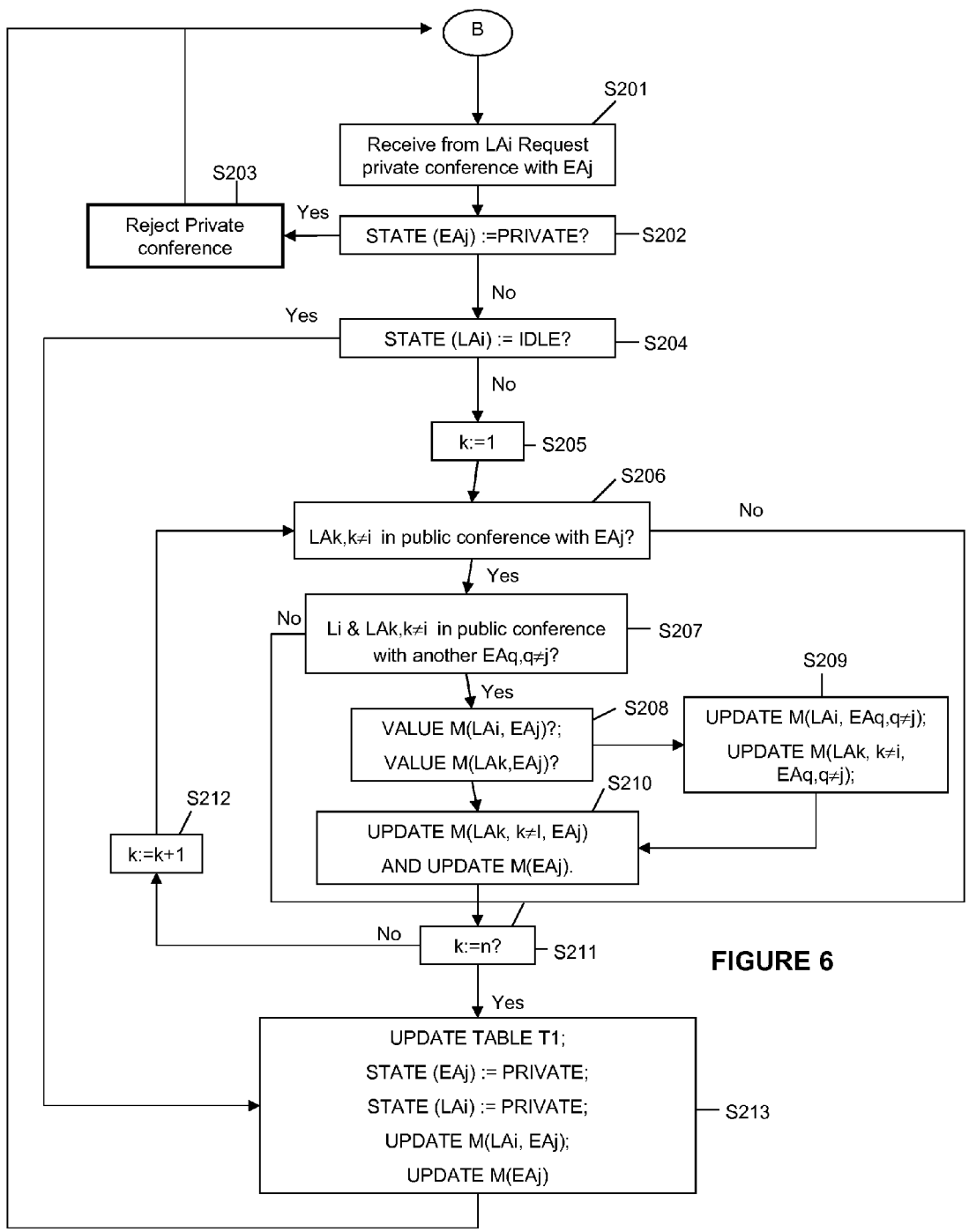
FIG. 6 shows the processing operation performed by the conference manager unit to establish a private conference between a local transceiver and an external transceiver according to one embodiment of the invention.

FIG. 6 shows the processing operation performed by the Conference Manager Unit 147 to establish a private conference between a local transceiver $LA_i$ and an external transceiver $EA_j$.

At Step S201, the Conferencing server 14 receives, through the direct communication channel between the local transceiver LAi and the external transceiver $EA_j$, a request R39 for a private conference.

At step S202, the conference manager unit 147 checks the status of the external transceiver EAj from Table T2 first. If the status is "PRIVATE", the external transceiver EAj is participating to a private conference with another local transceiver LAk,k≠i and the private conference between the external transceiver EAj and the local transceiver LAi cannot be established. Therefore, at step S203, the conference manager unit 147 requests the conferencing server 14 to send to the local transceiver LAi a message A40 refusing the request for public conference.

If the status is not "PRIVATE", the private conference with the local transceiver LAi can be established.

According to the invention, when a private conference between an external transceiver EAj and a local transceiver LAi is established, all other local agents LAk participating to a public conference with the same external agent EAj cannot listen nor talk to either the external agent EAj, or the local transceiver LAi. Therefore it is necessary to update the mixing matrices M(LAk,k≠I, EAj) associated to the conference between the external transceiver EAj and other local transceiver LAk,k≠I, when the other local transceiver LAk,k≠I takes part to a public conference with the external transceiver EAj.

Similarly, two local agents LAi, $LA_{k,k\neq i}$ may participate to a public conference with several external agents EAj and EAq,q≠p. To avoid that the first local agent $LA_{k,k\neq i}$ does not hear the voice of the second agent LAi twice (once through the first public conference and once through the second one), the incoming voice/video data signals of the local transceivers are only mixed and sent through a communication channel associated to one of the external transceivers only. It is necessary to check that this external transceiver is not the external transceiver EAj for which the private conference is established.

Therefore, at the following step S204, the conference manager unit 147 determines from the table T2 the state of the local transceiver $LA_i$. If the state is "IDLE", the local transceiver LAi is not participating to any conference and there is no need to update the mixing matrices of other local transceiver $LA_{k,k\neq i}$.

If the status of the local transceiver LAi is not "IDLE", the conference manager unit 147 determines at the following steps S205, whether any other local transceiver $LA_{k,k\neq i}$ has requested a public conference with the external transceiver EAj, from the table T1.

If it is not the case, the conference unit manager goes directly at step S211. Otherwise, at step S207, for each of these local transceiver the conference unit manager 147 checks from table T1 whether the local transceiver LAi and the other local transceiver $LA_{k,k\neq i}$ are participating to a same public conference with another external transceiver EAq,q≠j.

If not, the conference unit manager 147 goes directly at step S211. Otherwise, the conference unit manager checks at step S208 the value of the mixing matrix M(LAi, EAj) associated to the conference between the local transceiver LAi and the external transceiver EAj as well as the mixing matrix M(LAk,k≠i, EAj) associated to the conference between the other local transceiver LAk and the external transceiver EAj.

If for $M(LAi, EAj)$, $m_{LAk\neq LAi}:=1$ and/or for M(LAk,k≠i, EAj), $m_{LAk\neq LAi}:=1$, the voice/video data of both local transceivers are sent through the communication channels associated to the conference with the external transceiver EAj. Therefore, the conference unit manager 147, at step S209, updates the mixing matrices associated to only one of the conferences between the local transceiver LAi (resp. the other local transceiver LAk) and the other external transceiver EAq,q≠j as follows:

for M (LAi, EAq, q≠j), $m_{LAk\neq LAi}$:=1 for M(LAk,k≠i, EAq,q≠j), $m_{LAi}$:=1

Then the conference unit manager 147 goes at step S211.

If for M (LAi, EAj), $m_{LAk\neq LAi}$:=0 and/or for M (LAk,k≠i, EAj) $m_{LAk\neq LAi}$:=0, the conference unit manager 147 goes directly at step S210.

At step S210, the matrices M(LAk,k≠I, EAj) associated to the conference between the other local transceiver LAk,K≠I and the external transceiver EAj, as well as the matrix M(EAj) associated to the external transceiver EAj are updated as follows:

for M(LAk,k≠i, EAj), $m_{LAi}$:=0 and $m_{LAi}$:=0.

At the following step S213, the conference manager unit 147 changes the status of the external transceiver EAj and of the local transceiver LAi to "PRIVATE" and updates the table T2. The conference manager unit 147 further updates the mixing matrix M(LAi, EAj) associated to conferences between the local transceiver LAi and the external transceiver EAj as well as the mixing matrix M(EAj) associated to the external transceiver EAj as follows:

For M(LAi, EAj), $m_{EAj}$:=1 and $m_{Tk\neq EAj}$:=0

For M(EAj), $m_{LAi}$:=1 and $m_{Tk\neq LAi}$:=0

Thus the outgoing signals generator 148, when generating the outgoing voice/video signals for the local transceiver LAi (resp. external transceiver EAj), will mix the incoming voice/video data streams sent by the external transceiver EAj (resp. local transceiver LAi) only. The external transceiver EAj and the local transceiver LAi will not receive any signal from any other transceiver.

Figure 7:
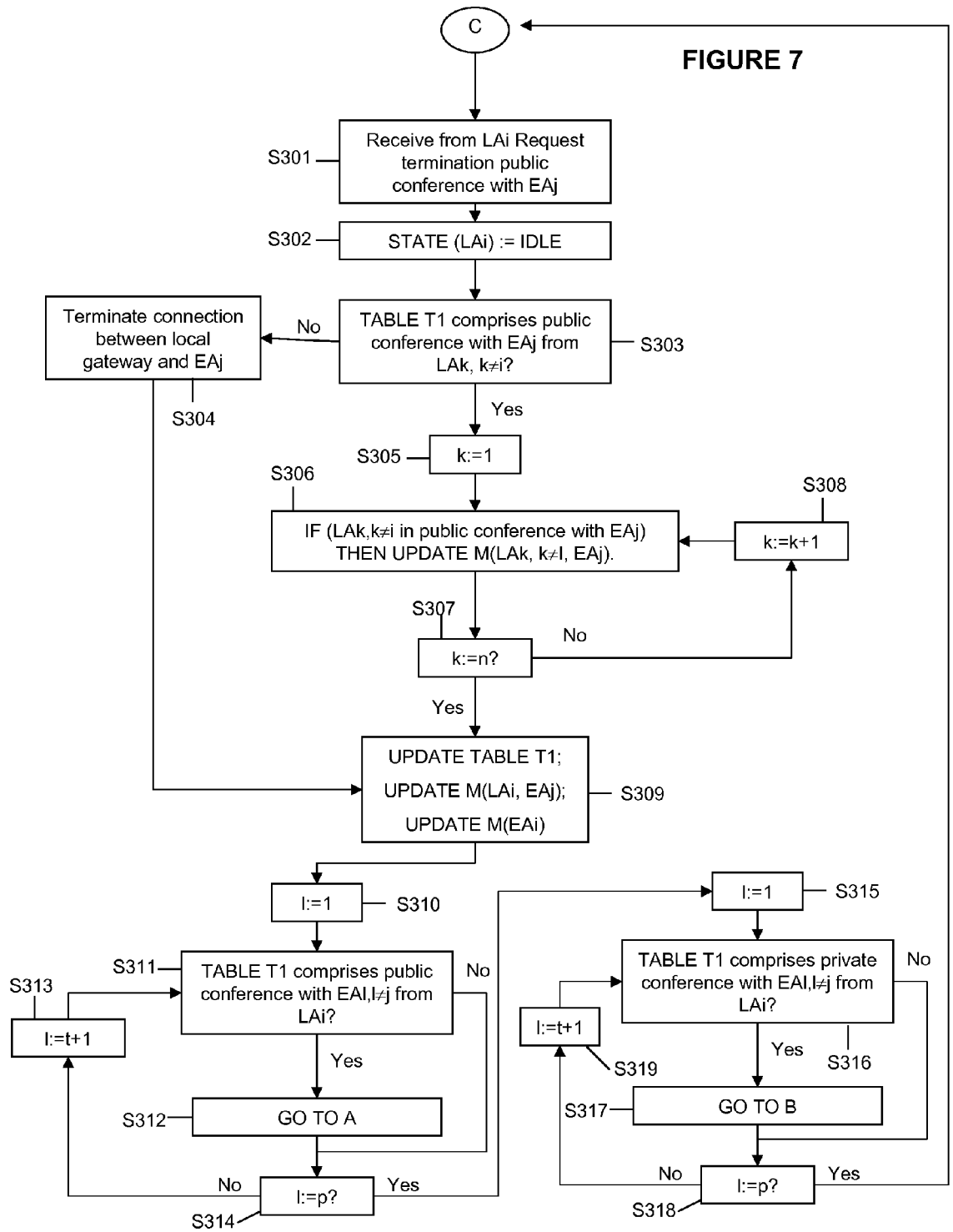
FIG. 7 shows the processing operation performed by the conference manager unit to terminate a public conference between a local and an external transceiver according to one embodiment of the invention.

FIG. 7 shows the processing operation performed by the Conference Manager Unit 147 to terminate a public conference between a local transceiver $LA_i$ and an external transceiver $EA_j$.

Table T1 represents the general map of the on-going conferences. When the conference manager unit 147 receives a request to terminate a public conference, it reconsiders the different generated outgoing signals which characteristics were modified due to the public conference and updates them, according to the on-going conferences, as if the public conference between the external transceiver EAj and the local transceiver LAi had never existed.

The Conferencing server 14 receives, at step 301, a request to cancel a public conference between the local transceiver $LA_i$ and the external transceiver $EA_j$ through the direct communication channel established between the conferencing server 14 and the local transceiver LAi.

At step S302, the status of the local transceiver LAi is set up to IDLE.

At the following step S303, the conference manager unit 147 checks from the table T1 whether any local transceiver is taking part to a public conference with the external transceiver EAj.

If not, at step S304, the conference unit manager 147 requests the conferencing server 14 to initiate the end of the connection between the local gateway 6 and the external transceiver EAj before going to step S309. Otherwise, at steps S305 to S310, the conference managing unit 147 checks, for each other local transceivers $LA_{k,k\neq i}$ whether the public conference has had some effect on their incoming and/or outgoing multimedia signal.

At step S306, the conference unit manager 147 updates the mixing matrix $M(LA_{k,k\neq i}, EAj)$ associated to the conference between the other local transceiver LAk and the external transceiver EAj as follows: $m_{LAi}$:=0. Thus the other local transceiver $LA_{k,k\neq i}$ will not receive the incoming data stream from the local transceiver LAi.

Then, at step S309, the conference manager unit 147 updates the different data relating to the external transceiver EAJ and the local transceiver LAi, in order to cancel the public conference:

The general table T1 is updated to remove the indication that the local transceiver LAi is participating to a public conference with EAj.

The mixing matrices M(LAi, EAj) and M(EAj) associated to the local transceiver LAi and to the external transceiver EAj are updated as follows:

For M(LAi, EAj), $m_{Tk}$:=0 for all transceiver Tk

For M(EAj), $m_{LAi}$:=0

Thus the outgoing signals generator 148, when generating the outgoing voice/video signals for the local transceiver LAi, will not mix any incoming voice/video data streams. The external transceiver EAj will not receive the incoming voice/video of the local transceiver LAi anymore.

Then at Step S310 to Step S314, the conference manager unit 147 checks for each other external transceiver EAl,l≠k, from Table T1 whether the local transceiver LAi was involved in any other public conference.

If it is the case, it is necessary to reconsider the characteristics of these public conferences. The conference manager unit 147 generates a request to establish a public conference between the local transceiver LAi and the other external transceiver EAl and handles such request, in step S312, according to the process to establish a public conference, as disclosed in FIG. 5.

Then at Step S315 to Step S319, the conference manager unit 147 checks for each other external transceiver EAl,l≠k, from Table T1 whether the local transceiver LAi was involved in any other private conference.

If it is the case, it is necessary to reconsider the characteristics of these private conferences. The conference manager unit 147 generates a request to establish a private conference between the local transceiver LAi and the other external transceiver EAl and handles such request, in step S313, according to the process to establish a private conference, as disclosed in FIG. 6.

Figure 8:
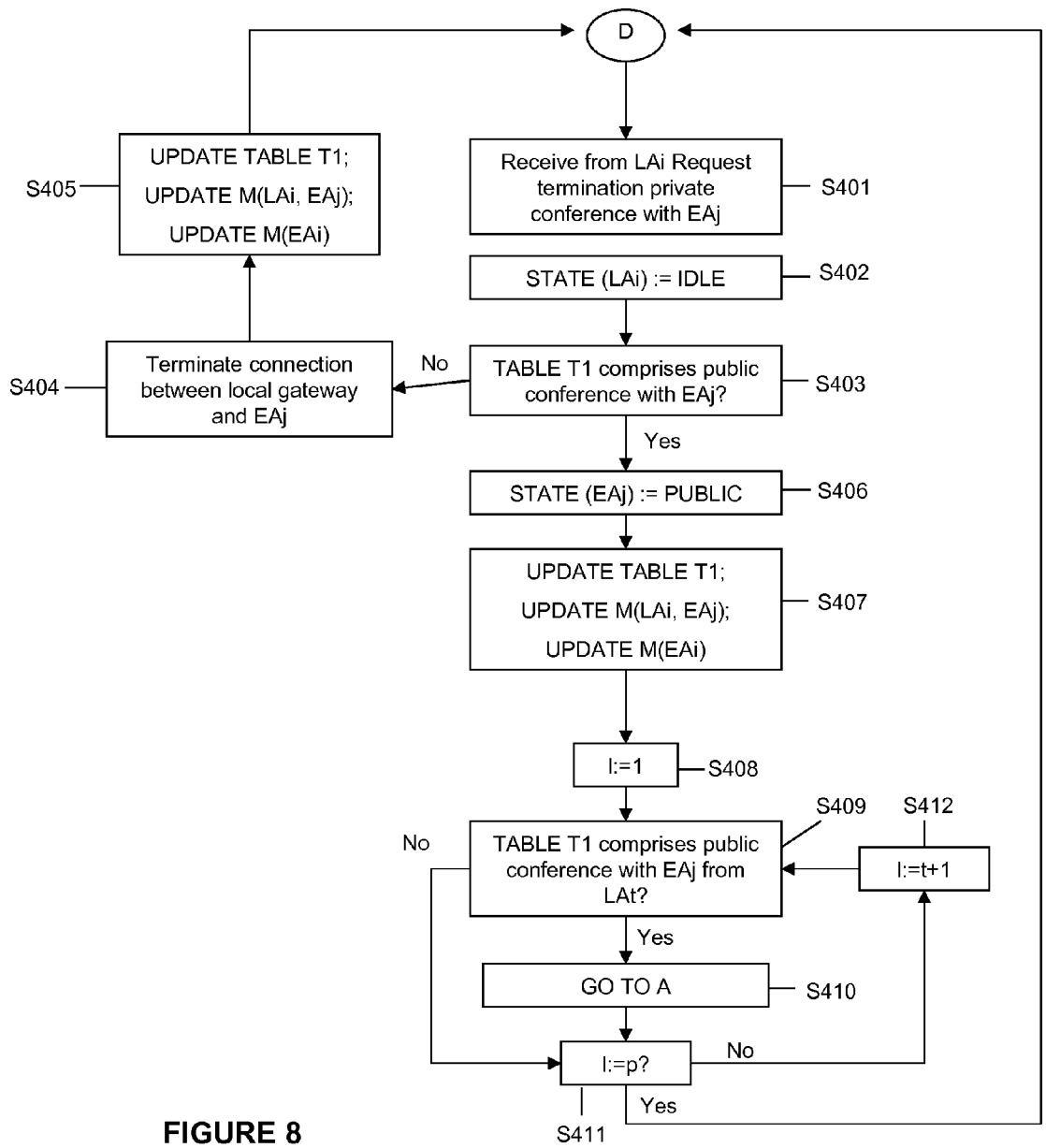
FIG. 8 shows the processing operation performed by the conference manager unit to terminate a private conference between a local and an external transceiver according to one embodiment of the invention.
Figure 9:
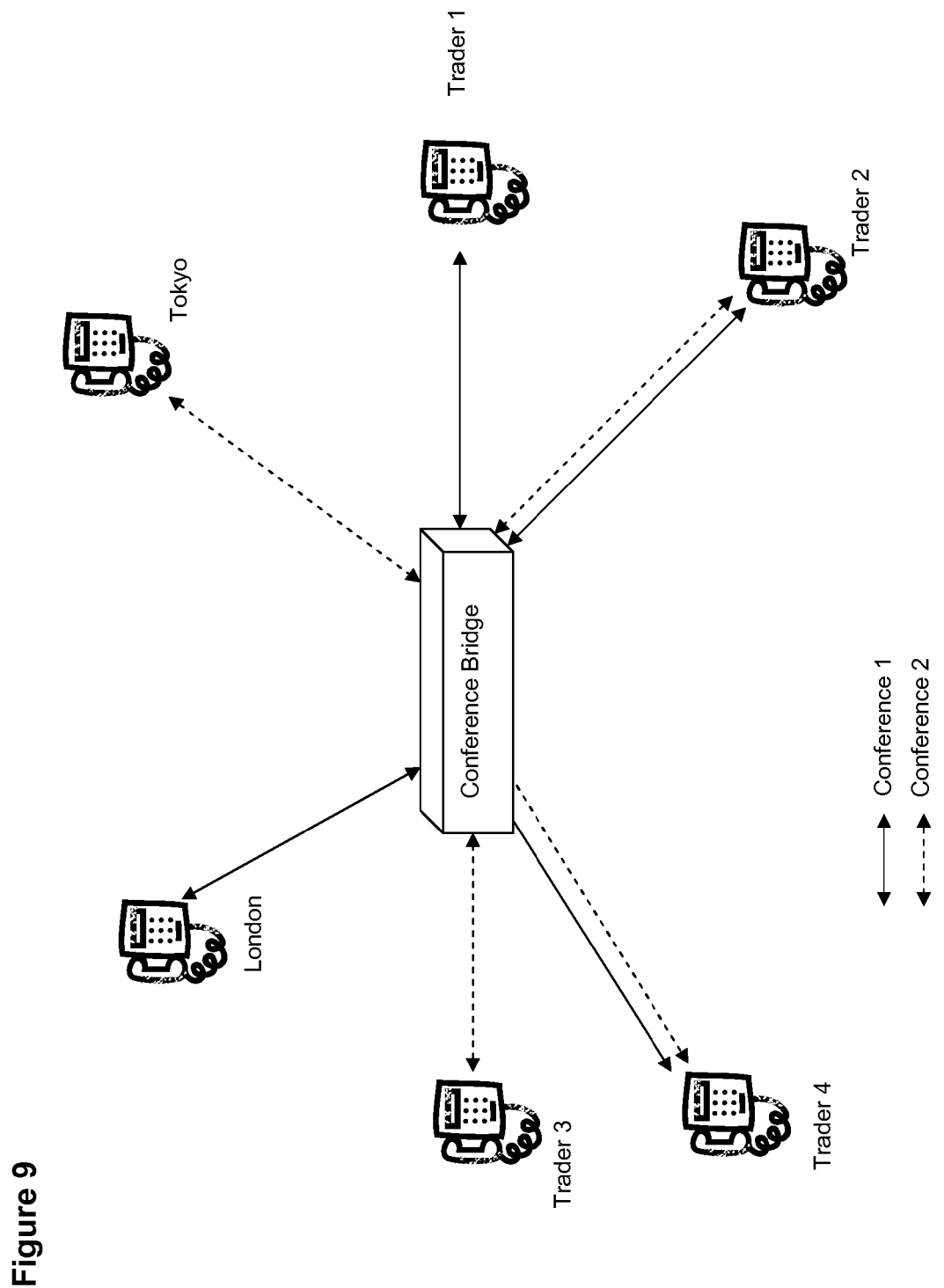
FIG. 9 shows an illustrative example of an asymmetrical conference between external and local transceivers.

FIG. 8 shows the processing operation performed by the Conference Manager Unit 147 to terminate a private conference between a local transceiver $LA_i$ and an external transceiver $EA_j$.

Table T1 represents the general map of the on-going conferences. When the conference manager unit 147 receives a request to terminate a private conference, it reconsiders the different on-going conferences which characteristics were modified due to the private conference and re-established them as if the private conference had never existed.

The conferencing server 14 receives, at step 401, a request to cancel a private conference between the local transceiver $LA_i$ and the external transceiver $EA_j$ through the direct communication channel established between the conferencing server 14 and the local transceiver LAi.

At step S402, the conference manager unit 147 updates table T2 and sets the status of the local transceiver LAi to IDLE.

At the following step S403, the conference manager unit 147 checks from the table T1 whether any local transceiver is taking part to a public conference with the external transceiver EAj.

If not, at step S404, the conference unit manager 147 requests the conferencing server 14 to initiate the end of the connection between the local gateway 6 and the external transceiver EAj. At the following step S405, the conference manager unit 147 updates the different data relating to the external transceiver EAJ and the local transceiver LAi in order to cancel the private conference:

The general table T1 is updated to remove the indication that local Transceiver LAi is holding a private conference with EAj. The mixing matrices M(LA, EAj) and M(EAj) associated to the local transceiver LAi and to the external transceiver EAj are updated as follows:

For M(LAi, EAj), $m_{Tk}$:=0 for all transceiver Tk;
For M(EAj), $m_{Tk}$:=0 for all transceiver Tk.

Otherwise, at step S406, the conference unit manager updates table T2 and sets the state of the external transceiver EAj to "PUBLIC". At the following step S407, the conference manager unit 147 updates the different data relating to the external transceiver EAJ and the local transceiver LAi, in order to cancel the private conference:

The general table T1 is updated to remove the indication that local Transceiver LAi is holding a private conference with EAj. The mixing matrices M(LA, EAj) and M(EAj) associated to the local transceiver LAi and to the external transceiver EAj are updated as follows:

For M(LAi, EAj), $m_{EAj}$:=0;
For M(EAj) $m_{LAi}$:=0.

At the following steps S408 to S412, the conference managing unit 147 checks, for each local transceiver (the local transceiver LAi as well as the other local transceiver $LA_{k,k\neq i}$) whether the private conference has had some effect on their incoming and/or outgoing multimedia signal.

At step S409, the conference unit manager 147 checks from table T1 which local transceiver is in a public conference with the external transceiver EAj. And for each of them, the conference unit manager 147 generates at step S410 a request to establish a public conference between the local transceiver LAt and the external transceiver EAj. The conference unit manager 147 handles such request according to the process to establish a private conference, as disclosed in FIG. 5.

The invention claimed is:

1. A multimedia conferencing apparatus for managing simultaneous asymmetrical public and/or private conferences wherein a conference takes place between an external transceiver and at least a local transceiver, local transceivers being able to take part to a plurality of conferences simultaneously, the apparatus comprising at least:
    a communication interface connected to at least a packet data communication network, the communication interface being operable to send and receive multimedia signals to and from the transceivers
    a conference managing means:
        for managing data indicating the existing public and/or private conferences and corresponding ones of the transceivers participating to said conferences;
        for managing, for each transceiver, a state, in the sense of a state of a Finite state machine, indicating whether a transceiver is participating to a private conference or to a public conference, wherein the conference managing unit is operable to determine, for each transceiver, which of the incoming multimedia signals received from other ones of the transceivers are accessible to said transceiver, based on the transceivers state and on the data characterising the existing conferences; and
    a signal generating means for generating, for each transceiver, at least an outgoing multimedia signal by mixing the incoming multimedia signals accessible to said transceiver.

2. A multimedia conferencing apparatus according to claim 1 wherein the conference managing means is operable to determine, for each local transceiver, and for each of the conferences said local transceiver is taking part to, accessible incoming multimedia signals, based on the transceivers state and on the data characterising the existing conferences.

3. A multimedia conferencing apparatus according to claim 2 wherein the signal generating means is operable to generate, for each local transceiver, a plurality of separate outgoing multimedia signals, each dedicated to one of the conference the local transceiver is taking part, by mixing the accessible incoming multimedia signals associated to said conference and said local transceiver.

4. A multimedia conferencing apparatus according to claim 2, wherein when two local transceivers are both simultaneously taking part to two or more public conferences with a same external transceiver, the incoming signal of the first local transceiver is mixed in only one of the outgoing signals of the second transceiver and vice-versa.

5. A multimedia conferencing apparatus according to claim 2, wherein the communication interface is operable to receive at least a request from at least a local transceiver to take part to a private or public conference with an external transceiver and wherein the conference managing means is operable to accept or refuse said request based upon the state of the external transceiver.

6. A multimedia conferencing apparatus according to claim 5, wherein the conference managing means is operable, to refuse said request, if the external transceiver participates to a private conference according to its corresponding state.

7. A multimedia conferencing apparatus according to claim 5, wherein the conference managing means is operable, upon acceptance of said request, to update data representing the existing conferences to add said requested conference or to add said local transceiver as a participant, if the conference with said external transceiver exists already.

8. A multimedia conferencing apparatus according to claim 5, wherein the conference managing means is operable, upon acceptance of said request, to give access to the local transceiver's incoming multimedia signal to the external transceiver and vice-versa.

9. A multimedia conferencing apparatus according to claim 5, wherein when said request is a request for a public conference, the conference managing means is operable to give access to the incoming multimedia signal of said local transceiver to at least some of the local transceivers already participating to a public conference with said external transceiver and vice-versa.

10. A multimedia conferencing apparatus according to claim 1, wherein the multimedia signals comprise voice-over-IP packet-based signals.

11. A multimedia conferencing apparatus according to claim 10, wherein it comprises a signalisation control unit operable to establish for each transceiver at least a direct bi-directional communication channel to exchange the multimedia signals associated to said transceiver.

12. A multimedia conferencing apparatus according to claim 11, wherein the signalisation control unit is operable to establish for each local transceiver, a plurality of separate direct bi-directional communication channels between the communication interface and the local transceiver, each dedicated to the communication with one external transceiver only.

13. Method for managing simultaneous asymmetrical public and/or private conferences, wherein a conference takes place between an external transceiver and at least a local transceiver, local transceiver being able to take part to a plurality of conferences simultaneously, the method being performed in a data processing apparatus connected to a data packet-switched network, said method comprising the steps of:

receiving, through at least a communication interface connected to the network, incoming multimedia signals from transceivers;

managing, by a conference managing means:

data indicating the existing public and/or private conferences and the transceivers participating to said conferences;

for each transceiver, a state, in the sense of a state of a finite state machine, indicating whether a transceiver is participating to a private conference or to a public conference;

determining, by said conference managing means, for each transceiver, which incoming multimedia signals received from corresponding other ones of the transceivers are accessible to said transceiver, based on the state of said corresponding other ones of the transceivers and on the data characterising the existing conferences; and generating, for each transceiver, by a signal generating means, at least an outgoing multimedia signal by mixing the incoming multimedia signals of the transceivers accessible to said transceiver.

14. A method according to claim 13, wherein when two local transceivers are both simultaneously taking part to two or more public conferences with a same external transceiver, the incoming signal of the first local transceiver is mixed in only one of the outgoing signals of the second transceiver and vice-versa.

15. A method according to claim 13, further comprising the steps of:

receiving through the communication interface a request from at least a local transceiver to take part to a private or public conference with an external transceiver; and accepting or refusing, by the conference managing means, said request based upon the state of the external transceiver.

16. A method according to claim 15, wherein said request is refused if the external transceiver participates to a private conference according to its corresponding state.

17. A method according to claim 15, wherein upon acceptance of said request, further including the step of updating data representing the existing conferences which includes adding said requested conference or said local transceiver as a participant, if the conference with said external transceiver exists already.

18. A method according to claim 15, wherein upon acceptance of said request, the method further comprises the step of giving access to the local transceiver's incoming multimedia signal to the external transceiver and vice-versa.

19. A method according to claim 15, wherein when said request is a request for a public conference, said method comprises the further step of giving access to the incoming multimedia signal of said local transceiver to at least some of the local transceivers already participating to a public conference with said external transceiver and vice and versa.

20. A method according to claim 13, wherein the multimedia signals comprise voice-over-IP packet-based signals.

21. A method according to claim 13, wherein said method further comprises the step of establishing, by a signalisation control unit, for each transceiver a direct bi-directional communication channel to exchange the multimedia signals associated to said transceiver.

22. A method according to claim 21, wherein the step of establishing for each local transceiver includes having each said separate bi-directional communication channel dedicated to communication having one external transceiver only.

23. A communication system for managing simultaneous asymmetrical public and/or private conferences, wherein a conference takes place between an external transceiver and at least a local transceiver, local transceivers being able to take part to a plurality of conferences simultaneously, said system comprising:

a local packet data communication network operable to transmit multimedia signals;

at least one local transceiver connected to said local network and operable to send and receive multimedia signals;

a gateway connected to the local network and to an external network, at least one external transceiver being connected to the external network; said gateway being operable to transmit multimedia signals between the external and the local network, characterized in that it comprises at least a multimedia conferencing apparatus according to claim 1 connected to the local network operable to send and receive multimedia signals to and from the transceivers in order to manage conferences between local and external transceivers.

24. Communication system according to claim 23 wherein the local network supports voice-over-IP protocol and wherein the multimedia signals comprise voice-over-IP packet-based signals.

25. Storage medium readable by a programmable processing apparatus, possibly entirely or partially detachable from said processing apparatus, including non-transitory digital media, characterised in that it comprises instructions to program a programmable processing apparatus to become operable according to claim 1.

26. Storage medium of claim 25 wherein said non-transitory digital media includes at least one of digital versatile disk or compact disk or magnetic media, a hard drive or floppy disk or non-transitory transmissible data media.

27. Computer programme storage media having stored non-transitory instructions to program a programmable data processing apparatus to become operable according to claim 13, when said programme is loaded and executed by said data processing apparatus.

28. Computer programme storage medium of claim 27 wherein said storage media includes at least one of digital versatile disk or compact disk or magnetic media, a hard drive or floppy disk or non-transitory transmissible data media.

* * * * *